United States Patent
Lutz et al.

(10) Patent No.: US 11,224,886 B2
(45) Date of Patent: Jan. 18, 2022

(54) POWDER CONVEYOR FOR THE CONVEYING OF COATING POWDER, AND POWDER CENTER COMPRISING THE POWDER CONVEYOR FOR SUPPLYING A POWDER COATING FACILITY

(71) Applicant: Wagner International AG, Altstatten (CH)

(72) Inventors: Gilbert Lutz, Kriessern (CH); Patrik Studerus, Steinach (CH); Michael Dietsche, Kriessern (CH)

(73) Assignee: Wagner International AG, Altstatten (CH)

( * ) Notice: Subject to any disclaimer, the term of this patent is extended or adjusted under 35 U.S.C. 154(b) by 0 days.

(21) Appl. No.: 16/381,935

(22) Filed: Apr. 11, 2019

(65) Prior Publication Data

US 2019/0314837 A1 Oct. 17, 2019

(30) Foreign Application Priority Data

Apr. 12, 2018 (EP) ..................................... 18167071

(51) Int. Cl.
*B05B 7/14* (2006.01)
*B65G 53/28* (2006.01)

(52) U.S. Cl.
CPC .......... *B05B 7/1459* (2013.01); *B05B 7/1472* (2013.01); *B65G 53/28* (2013.01)

(58) Field of Classification Search
CPC ....... B65B 55/106; B65B 55/00; B65B 55/20; B65B 55/04; B65B 55/10; B65B 55/02;
(Continued)

(56) References Cited

U.S. PATENT DOCUMENTS 3,260,285 A * 7/1966 Vogt ........................ B65B 1/16
 141/8
3,710,428 A * 1/1973 Bjalme ................... F16L 19/04
 29/237
(Continued)

FOREIGN PATENT DOCUMENTS

DE 10 2005 006522 B3 8/2006
EP 1752399 A1 * 2/2007 ........... B05B 7/1459
(Continued)

OTHER PUBLICATIONS

JP-2001259551-A English Translation of Specification (Year: 2020).*
(Continued)

*Primary Examiner* — Timothy P. Kelly
*Assistant Examiner* — Stephanie A Shrieves
(74) *Attorney, Agent, or Firm* — Renner, otto, Boisselle & Sklar, LLP

(57) ABSTRACT

A powder conveyor for conveying coating powder includes a housing for a container that includes a top part of the housing with a powder inlet and an upper ledge as well as a bottom part of the housing with a powder outlet and a lower ledge. The upper ledge and/or the lower ledge is/are situated at an acute angle with respect to the horizontal line. A tube is provided whose tube ends are open such that the powder can pass through the tube. The tube is made of a porous air-permeable material and is clamped, on the end face side, between the upper ledge and the lower ledge. A powder inlet valve is connected to the powder inlet of the top part of the housing. A powder outlet valve is connected to the powder outlet of the bottom part of the housing.

15 Claims, 16 Drawing Sheets

(58) Field of Classification Search
CPC ..... B65B 55/022; B65B 55/12; B65B 55/103; B65B 55/08; B65B 55/06; B65B 55/027; B65B 55/025; B65B 55/19; B65B 55/18; B65B 55/16; B65B 55/14; B67C 3/001; B67C 3/005; B67C 3/004; B05B 7/1459; B05B 7/1472; B05B 7/1404; B05B 15/55; B05B 12/00; B05B 7/166; B65G 53/28
USPC ................................................ 141/85, 89–92
See application file for complete search history.

(56) References Cited

U.S. PATENT DOCUMENTS

| | | | | |
|---|---|---|---|---|
| 5,366,258 | A * | 11/1994 | Lamouche | F16L 31/00 285/260 |
| 6,287,056 | B1 * | 9/2001 | Szikszay | B65G 53/12 406/127 |
| 6,398,462 | B1 * | 6/2002 | Fulkerson | B05B 7/1404 406/134 |
| 7,150,585 | B2 * | 12/2006 | Kleineidam | B05B 7/1459 406/50 |
| 8,801,340 | B2 * | 8/2014 | Berggren | B65G 53/52 406/191 |
| 2003/0046956 | A1 * | 3/2003 | Anderson | C03B 23/092 65/108 |
| 2004/0137144 | A1 * | 7/2004 | Shutic | B05B 7/1454 427/180 |
| 2007/0095945 | A1 * | 5/2007 | Keudell | B05B 7/1459 239/398 |
| 2008/0257257 | A1 * | 10/2008 | Mauchle | B05B 7/1404 118/302 |
| 2010/0255975 | A1 * | 10/2010 | Mauchle | B04C 5/18 494/2 |
| 2013/0019970 | A1 * | 1/2013 | Kleineidam | B05B 7/1472 137/565.01 |
| 2016/0122138 | A1 * | 5/2016 | Mauchle | B05B 7/1463 406/14 |
| 2019/0293092 | A1 * | 9/2019 | Perillo | F04B 7/0275 |

FOREIGN PATENT DOCUMENTS

| | | |
|---|---|---|
| EP | 3 238 832 A1 | 11/2017 |
| JP | 2001259551 A * | 9/2001 |

OTHER PUBLICATIONS

EP-1752399-A1 English Translation of Specification (Year: 2021).*
Search Report for corresponding European App. No. 18167071.2, dated Aug. 10, 2018.

* cited by examiner

POWDER CONVEYOR FOR THE CONVEYING OF COATING POWDER, AND POWDER CENTER COMPRISING THE POWDER CONVEYOR FOR SUPPLYING A POWDER COATING FACILITY

This application claims priority under 35 USC § 119 to European patent application number 18167071.2, filed on Apr. 12, 2018, the entire disclosure of which is incorporated herein by reference.

TECHNICAL FIELD

The invention relates to a powder conveyor for the conveying of coating powder, and to a powder center comprising the powder conveyor for supplying a powder coating facility.

DESCRIPTION OF RELATED ART

A powder conveying device for the conveying of coating powder to a powder applicator is known from European patent application EP 3 238 832 A1. The powder conveying device comprises an intermediate container that comprises a powder inlet valve and a powder outlet valve, whereby the latter is connected to the working container arranged below it. The intermediate container serves, as a powder conveyor, for the conveying of coating powder from a powder reservoir container into the working container. A semipermeable wall that is permeable to air, but impermeable to powder is situated in the intermediate container.

When the air is suctioned through the semipermeable wall out of the intermediate container, a negative pressure arises there and powder is suctioned into the intermediate container. As soon as the powder outlet valve is being opened, the powder drops into the working container under the effect of gravity. Powder may become deposited in the intermediate container during the conveying of powder. Said powder deposits can increase the cleaning effort when a color switch is to be effected.

SUMMARY OF THE INVENTION

It is an object of the invention to devise a powder conveyor for the conveying of coating powder and a powder center with the powder conveyor for supplying a powder coating facility, in which the possibility of powder being deposited on the inside of the powder conveyor is minimized.

Advantageously, the powder conveyor according to the invention allows the powder to be conveyed into a powder reservoir container by making use of gravity and of little or no additional compressed air. This type of conveying generates less powder-air mixture that might escape outwards. Accordingly, this minimizes the risk of powder particles being inhaled. It is another advantage that this type of conveying is associated with only little wear on an ultrasound screen that may be used in the powder conveyor.

The object is met by a powder conveyor for the conveying of coating powder having the features described herein.

The powder conveyor according to the invention for the conveying of coating powder comprises a housing for a container. The housing comprises a top part of the housing with a powder inlet and an upper ledge. Moreover, the housing comprises a bottom part of the housing with a powder outlet and a lower ledge. The upper ledge and/or the lower ledge is/are situated at an acute angle with respect to the horizontal line. Moreover, a tube is provided whose tube ends are open such that the powder can pass through the tube. The tube is made of a porous air-permeable material and is clamped, on the end face side, between the upper ledge of the top part of the housing and the lower ledge of the bottom part of the housing. Moreover, a powder inlet valve that is connected to the powder inlet of the top part of the housing is provided. Moreover, a powder outlet valve that is connected to the powder outlet of the bottom part of the housing is provided.

The object is also met by a powder center with the powder conveyor described above for supplying a powder coating facility having the features described herein.

The powder center for supplying a powder coating facility with coating powder comprises the powder conveyor described above for supplying a powder reservoir container. The powder reservoir container comprises a powder conveying device for transporting powder out of the powder reservoir container in the direction of the powder coating facility. Moreover, the invention comprises a container lid that covers the powder reservoir container while powder is being conveyed and can be removed for the purpose of cleaning the powder reservoir container. The powder center also comprises a cleaning unit for cleaning of the powder reservoir container and of the container lid. The cleaning unit can be moved from a parking position next to the powder reservoir container into a cleaning position inside the powder reservoir container by means of a manipulator. Moreover, a controller is provided by means of which the powder conveyor, the powder conveying device, the cleaning unit, and the manipulator can be controlled.

The object is also met by a method for the production of the powder conveyor described above having the features describe herein.

The method according to the invention for the production of the powder conveyor described above comprises the following steps. The tube is being heated. A tool is used to shape the tube ends of the heated tube appropriately such that the end faces of the tube match the slanted ledges in the housing. The tube is being clamped between the top part of the housing and the bottom part of the housing.

Advantageous developments of the invention are evident from the features described herein.

In an embodiment of the powder conveyor according to the invention, the top part of the housing is designed to be funnel-shaped.

In another embodiment of the powder conveyor according to the invention, the bottom part of the housing is designed to be funnel-shaped.

In yet another embodiment of the powder conveyor according to the invention, the angle of the upper ledge and/or of the lower ledge is in the range of 1° to 7°.

The powder conveyor according to the invention can be provided appropriately such that the inner wall adjacent to the upper ledge forms an angle with respect to the vertical line that is in a range of 5° to 15°.

The powder conveyor according to the invention can also be provided appropriately such that the inner wall adjacent to the lower ledge forms an angle with respect to the vertical line that is in a range of 5° to 15°.

In a development of the powder conveyor according to the invention, the distance between the upper ledge and the lower ledge decreases towards the longitudinal axis of the housing. As a result, the ends of the tube are not being pushed inward. This makes sure that no ledge forms at the transition between the upper tube end and the top part of the housing such that no powder can become deposited in this location. The same applies analogously to the transition between the lower tube end and the bottom part of the housing.

In another development of the powder conveyor according to the invention, the first and/or second tube ends comprise a chamfer.

In an additional development of the powder conveyor according to the invention, the tube has a length that is between 1 mm and 3 mm larger than the distance between the upper ledge and the lower ledge.

The housing of the powder conveyor according to the invention can comprise a tube-shaped middle part of the housing.

The powder conveyor according to the invention can also be provided such that the middle part of the housing is screwed and/or glued to the bottom part of the housing.

In an embodiment of the powder center according to the invention, the controller is designed and can be operated appropriately such that it can purge the inside of the powder conveyor with purging air during cleaning mode.

In another embodiment of the powder center according to the invention, the cleaning unit comprises compressed air nozzles for blowing off the powder reservoir container and the container lid.

BRIEF DESCRIPTION OF THE DRAWINGS

The invention and several exemplary embodiments are illustrated in more detail in the following based on 18 figures.

DETAILED DESCRIPTION OF THE INVENTION

Figure 1:
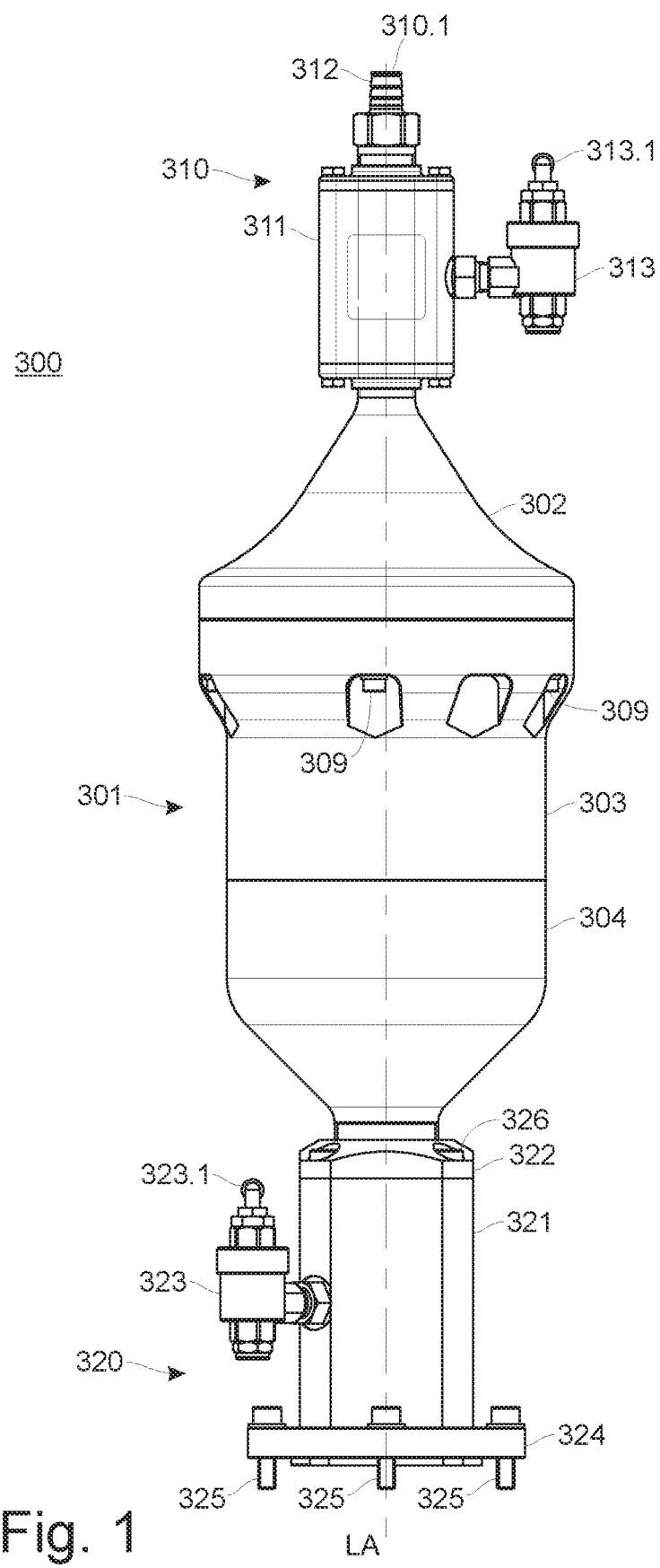
FIG. 1 shows a side view of a first possible embodiment of the powder conveyor according to the invention for the conveying of coating powder.
Figure 2:
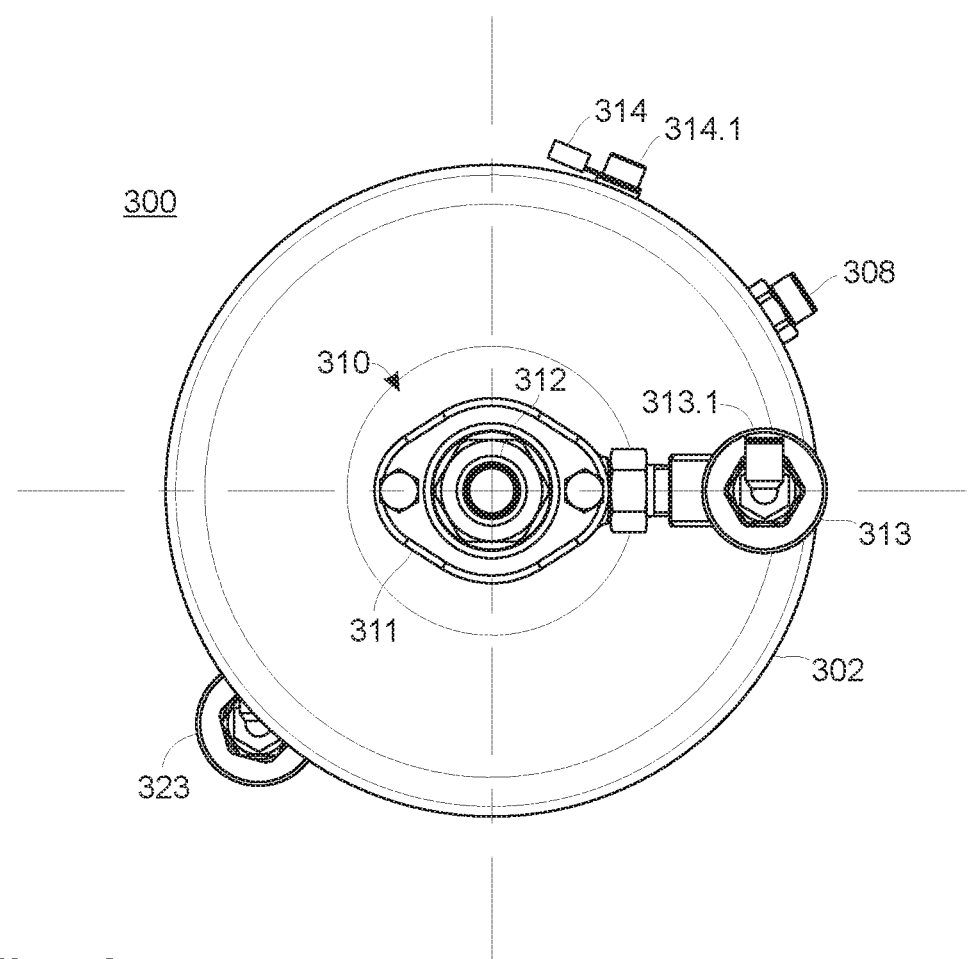
FIG. 2 shows a top view of the first embodiment of the powder conveyor according to the invention for the conveying of coating powder.
Figure 3:
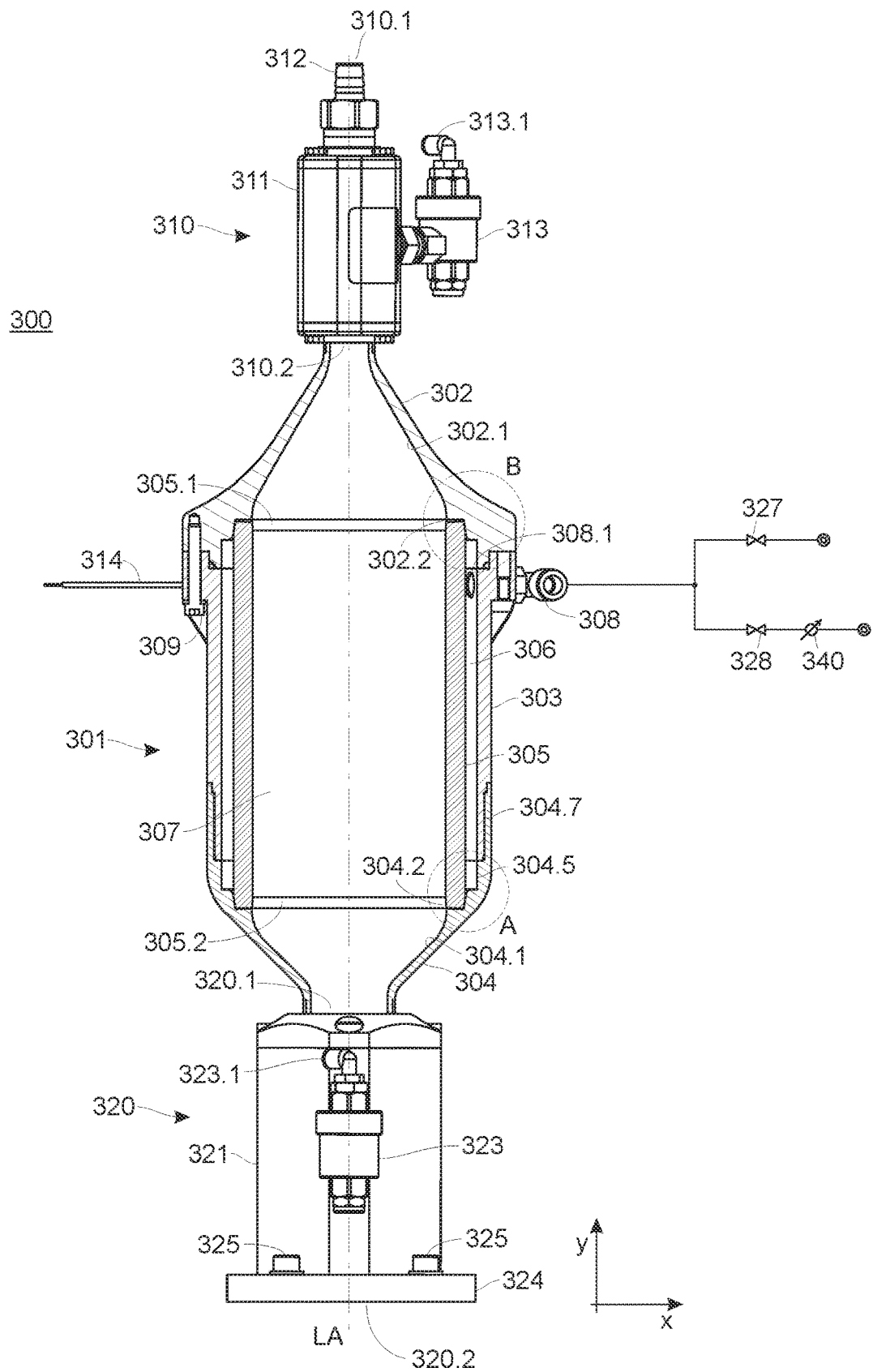
FIG. 3 shows a longitudinal section of the first embodiment of the powder conveyor according to the invention.
Figure 4:
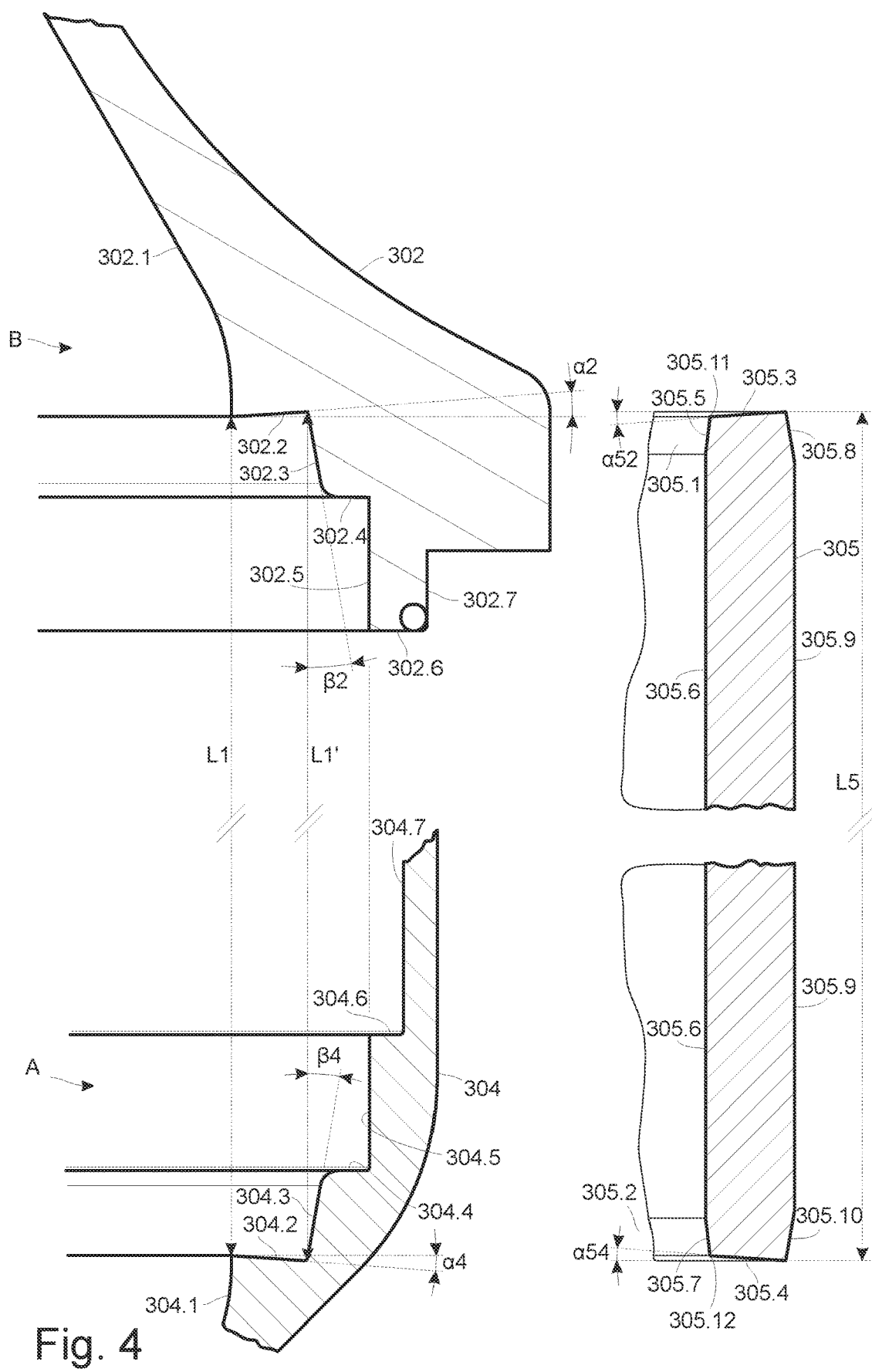
FIG. 4 shows a longitudinal section of details of the powder conveyor according to the invention.

FIG. 1 shows a side view of a first possible embodiment of the powder conveyor 300 according to the invention for the conveying of coating powder. FIG. 2 shows a top view of the powder conveyor 300. FIG. 3 shows a longitudinal section of the powder conveyor 300. FIG. 4 shows a longitudinal section of details A and B from FIG. 3 as well as a part of tube 305 of the powder conveyor 300 according to the invention. The powder that can be conveyed with the powder conveyor 300 can, for example, be fresh powder or recycled powder.

The powder conveyor 300 comprises, on the input side, a powder inlet valve 310 with a powder inlet 310.1. When the powder inlet valve 310 is open, powder can be suctioned or pumped into a container 301 that is adjacent to the powder inlet valve 310. The container 301 shall also be referred to as intermediate container hereinafter. It comprises a container housing, or housing for short, with a top part of the housing 302, a middle part of the housing 303, and a bottom part of the housing 304.

The powder inlet valve 310 can be designed as a crusher. To open the powder inlet valve 310, the control connector 313.1 of the valve 313 is switched such as to be depressurized. The valve 313 is preferably designed as a quick exhaust valve. In case of need, this allows the pressure in the powder inlet valve 311 to be reduced more rapidly and its valve opening time to be shortened.

The powder conveyor 300 comprises, on the output side, a powder outlet valve 320 with a powder inlet 320.1 and a powder outlet 320.2. The powder outlet valve 320 can be designed as a crusher. To open the powder outlet valve 320, the control connector 323.1 of the valve 323 is switched such as to be depressurized. Like valve 313, valve 323 can also be designed as a quick exhaust valve. In case of need, this allows the pressure in the powder outlet valve 320 to be reduced more rapidly.

As shown in FIGS. 3 and 4, the top part of the housing 302 has a funnel-shaped inner side 302.1. The funnel-shaped contour helps channeling the powder flowing into the intermediate container 301 without the powder adhering to the inner wall of the top part of the housing 302. In the lower area, there is a ledge 302.2 adjacent to the funnel-shaped inner side 302.1, which shall also be referred to as upper ledge hereinafter. The ledge 302.2 is a ring-shaped surface that extends somewhat slanted with respect to the horizontal line. The angle $\alpha 2$ between the horizontal line and the slanted surface 302.2 is between 1° and 7°. Preferably, the angle is $\alpha 2=4°$.

The angles $\alpha 2$ and $\alpha 4$ are selected appropriately such that the distance L1 between the upper ledge 302.2 and the lower ledge 304.2 decreases towards the longitudinal axis LA of the container 301. This means that the distance L1 is smaller than the distance L1'. What this attains is that the ends 305.1 and 305.2 of the tube 305 are not pushed inward or can not be deformed in an undefined manner (e.g. become oval and leaky), when the tube 305 is being clamped between the upper and the lower ledges 302.2 and 304.2. This makes sure that no ledge, offset or gap arises in the area of the ledge 302.2, i.e. at the transition between the upper tube end 305.1 and the funnel-shaped inner wall 302.1 of the top part of the housing, and that no powder can become deposited in these places. The same applies analogously to the transition between the lower tube end 305.2 and the funnel-shaped inner wall 304.1 on the bottom part of the housing.

An inner wall 302.3, which deviates somewhat from the vertical line, is situated adjacent to the ledge 302.2. The angle β2, by which the internal wall 302.3 deviates from the vertical line, is between 5° and 15°. Preferably, the angle is β2=10°.

When the tube 305 is being pushed in the direction of the ledge 302.2 by its upper end 305.1, the side wall 302.3 forms a guidance that tapers in upward direction and thus acts as a centering aid for the tube 305. Another ledge 302.4 is situated adjacent to the side wall 302.3, and another side wall 302.5 is situated adjacent to said ledge.

The lower end of the top part of the housing 302 is designed as a round socket 302.7. The middle part of the housing 303 is plugged onto said socket 302.7 that bears a seal. The middle part of the housing 303 can be screwed to the top part of the housing 302 by means of multiple screws 309. The lower end of the middle part of the housing 303 is plugged into a ring-shaped receptacle of the bottom part of the housing 304.

Like the top part of the housing 302, the bottom part of the housing 304 also comprises a funnel-shaped inner side 304.1. The funnel-shaped contour helps channeling the powder that is present in the intermediate container 301 to the outlet 320.1 without the powder adhering to the inner wall 304.1 of the bottom part of the housing 304. In the upper area, a ledge 304.2 is situated adjacent to the funnel-shaped inner side 304.1. The ledge 304.2 shall be referred to as lower ledge hereinafter and is a ring-shaped surface that extends such as to be slightly slanted with respect to the horizontal line. The angle α4 between the horizontal line and the slanted surface 304.2 is between 1° and 7°. Preferably, the angle is α4=4°.

When the tube 305 is being pushed in the direction of the lower ledge 304.2 by its lower end 305.2, the side wall 304.3 forms a guidance that tapers in downward direction and thus acts as a centering aid for the tube 305. Another ledge 304.4 is situated adjacent to the side wall 304.3, and another side wall 304.5 is situated adjacent to said ledge.

Like the side wall 302.5, the side wall 304.5 is situated at a distance from the outer side 305.9 of the tube 305 such that a clearance 306 is generated between the side walls 302.5, 304.5, and the outer side 305.9. The outer side 305.9 does not touch anywhere in the area between the horizontal surfaces 302.4 and 304.4 such that this section of the outer side 305.9 can be used to allow air to pass through the semipermeable tube 305.

The upper end of the bottom part of the housing 304 is preferably designed as a round socket 304.7 and forms a receptacle for the lower section of the middle part of the housing 303. The lower section of the middle part of the housing 303 is plugged into the receptacle and can be glued to same. This produces, in simple manner, a secure and tight connection between the middle part of the housing 303 and the bottom part of the housing 304. The two housing parts 303 and 304 can just as well be screwed to each other by means of threads (not shown in the Figures). The screw connection can be sealed with an appropriate adhesive and/or a seal, e.g. an O-ring. Instead, the middle part of the housing 303 and the bottom part of the housing 304 can be manufactured from a single part. This is advantageous in that there is no longer a connection present between the middle part of the housing 303 and the bottom part of the housing 304 and in that the sealing can be omitted as well.

Production and Assembly

Being a semi-finished product, the tube 305 initially has a cylindrical shape without tapering at the ends 305.1 and 305.2. In order to shape the ends 305.1 and 305.2 as desired (see FIG. 4), the tube is being heated in a first step, at least in the area of the ends 305.1 and 305.2. A tool is then used to reshape the tube ends 305.1 and 305.2 of the heated, and thus softened, tube 305 such that the end faces 305.3 and 305.4 of the tube 305 become slanted and each comprise a chamfer. In this context, the upper tube end 305.1 can receive a chamfer 305.5 and 305.8 both inside and outside. Likewise, the lower tube end 305.2 can receive a chamfer 305.7 and 305.10 both inside and outside.

The angle of the chamfer 305.8 is preferably selected appropriately such that it corresponds to the angle β2 of the side surface 302.3. Likewise, the angle of the chamfer 305.10 is also preferably selected appropriately such that it corresponds to the angle β4 of the side surface 304.3.

The angle α52 of the end face 305.3 is preferably selected appropriately such that it is identical to the angle α2 of the ledge 302.2, when the tube 305 is incorporated into the housing 301. Before the tube 305 is incorporated, the angle α52 of the end face 305.3 is preferably smaller than the angle α2.

The same applies analogously to the angle α54 of the end face 305.4 as well. The angle α54 is preferably selected appropriately such that it is identical to the angle α4 of the ledge 304.2, when the tube 305 is incorporated into the housing 301. Before the tube 305 is incorporated, the angle α54 of the end face 305.4 is preferably smaller than the angle α4.

The tube 305 is preferably being clamped in the housing 301, between the two ledges 302.2 and 304.2, using a sufficient force such that the upper inner edge 305.11 and the lower inner edge 305.12 of the tube 305 become deformed and adapt to the inclination of the ledges 302.2 and 304.2. This is advantageous in that any gaps between the ledge 302.2 and the end face 305.3 and/or between the ledge 304.2 and the end face 305.4 are omitted and/or eliminated.

Accordingly, the angles α52 and α54 of the end faces 305.3 and 305.4 of the tube 305 match the angles α2 and α4 of the slanted ledges 302.2 and 304.2. When the tube 305 is incorporated in the housing, the end faces 305.3 and 305.4 of the tube 305 fit in the top part of the housing 302 and/or in the bottom part of the housing 304 in a form-fitting manner.

The deformation of the tube 305 is preferably effected by means of pressure. The deformation by pressure compacts the material at the upper tube end 305.1 and at the lower tube end 305.2. This is advantageous in that the tube 305 gets more robust.

For assembly, the tube 305 is being clamped between the top part of the housing 302 and the bottom part of the housing 304. The top part of the housing 302 can now be screwed to the middle part of the housing 303 by means of the screws 309. The tube 305 is now clamped between the two slightly slanted surfaces 302.2 and 304.2 and is affixed in a form-fitting manner.

If the powder conveyor 300 is to be used in an area with an elevated explosion hazard, a grounding can be provided on the powder conveyor. The grounding cable 314 can be electrically connected to the powder conveyor 300 by means of a screw on the grounding connector 314.1. The grounding connector 314.1 can be situated, for example, on the middle part of the housing 302.

The operating mode of the powder conveyor 300 shall be illustrated in more detail in the following. It is presumed that there is no powder present in the intermediate container 301 initially. In a first step, the valves 310 and 320 are being closed such that neither can powder get into the intermediate container 301 nor can powder be transported out of the intermediate container 301. Then, the vacuum valve 327 is being opened in order to generate a negative pressure in the intermediate container 301. In this context, the air is aspirated out of the intermediate container 301 through the air-permeable pores of the tube 305. As soon as the powder inlet valve 310 is being opened, powder is suctioned into the intermediate container 301. There is no need to wait for a definite negative pressure to be established in the intermediate container 301. The powder inlet valve 310 can be opened at any time, i.e. shortly before the vacuum valve 327 is being opened, simultaneous with the vacuum valve 327 being opened or after the vacuum valve 327 was opened. Once a sufficient powder quantity has accumulated in the powder chamber 307 of the intermediate container 301, the vacuum valve 327 and the powder inlet valve 310 are being closed again. A suction process of this type can take, for example, 6 seconds to be completed. Subsequently, the outlet valve 320 is being opened such that the powder can flow out of the intermediate container 301. This can take place utilizing the effect of gravity. In order to support the transport of powder out of the intermediate container 301, compressed air can be blown through the connector 308 and the opening 308.1 into the intermediate container 301. The valve 328 is being opened for this purpose. Initially, the compressed air moves through the connector 308 and the opening 308.1 into the space 306. Subsequently, it flows through the semipermeable tube 305 into the powder chamber 307. The compressed air aids the cleaning of the inner wall 305.6 of the tube during each conveying cycle.

The powder conveyor 300 is designed for the conveying of powder quantities of preferably approximately 1 Liter (0.3-1.5 Liter) per cycle. A conveying cycle of this type can take, for example, approximately 5 to 20 seconds, typically 10 to 12 seconds, to be completed.

As shown in FIG. 3, the connector 308 can be situated in the middle part of the housing 303. The connector 308 is connected to the space 306 via the opening 308.1, which is designed as a through hole in the middle part of the housing 303.

Figure 5:
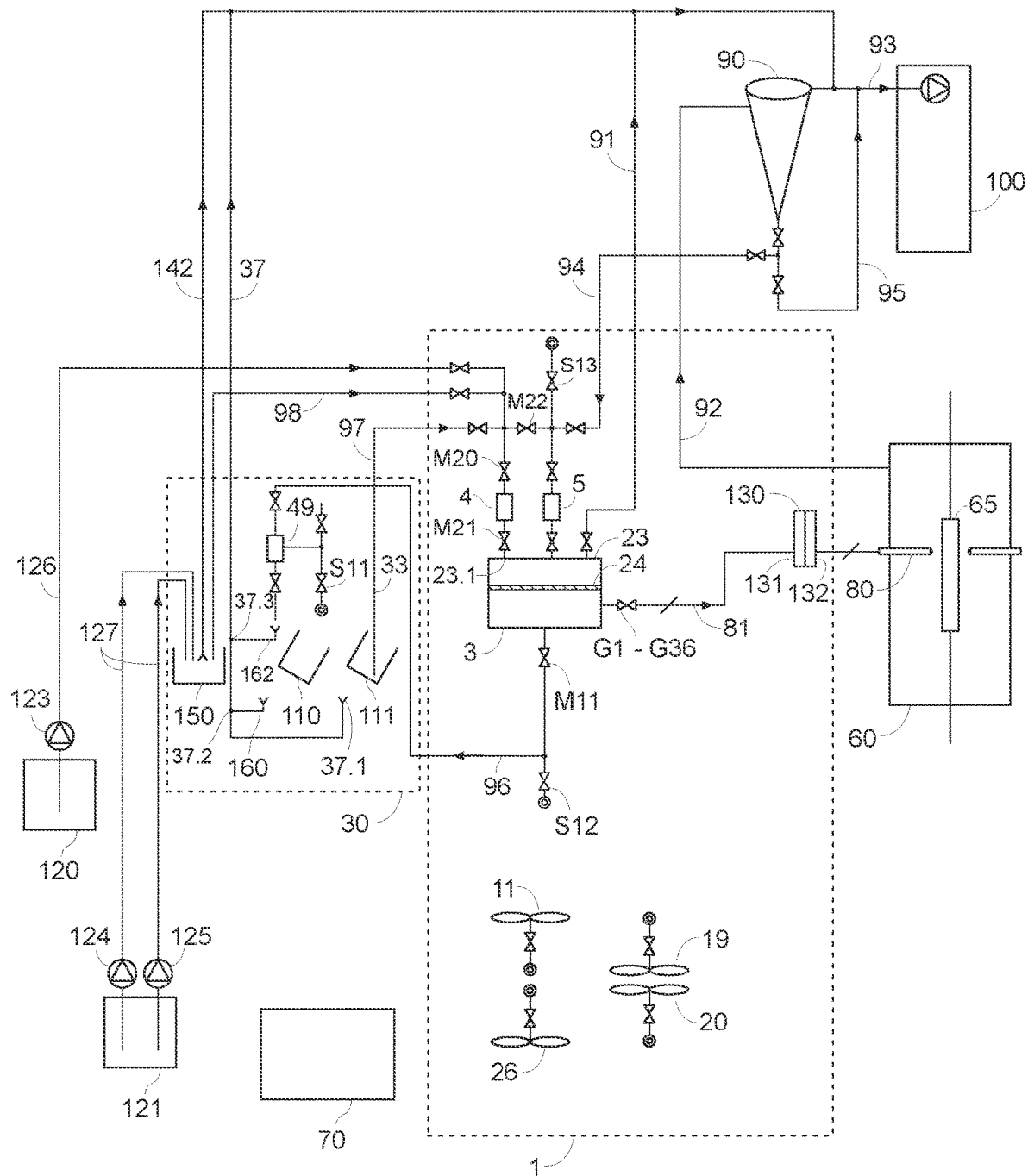
FIG. 5 shows a schematic block diagram of a powder coating facility having multiple powder conveyors according to the invention.
Figure 6:
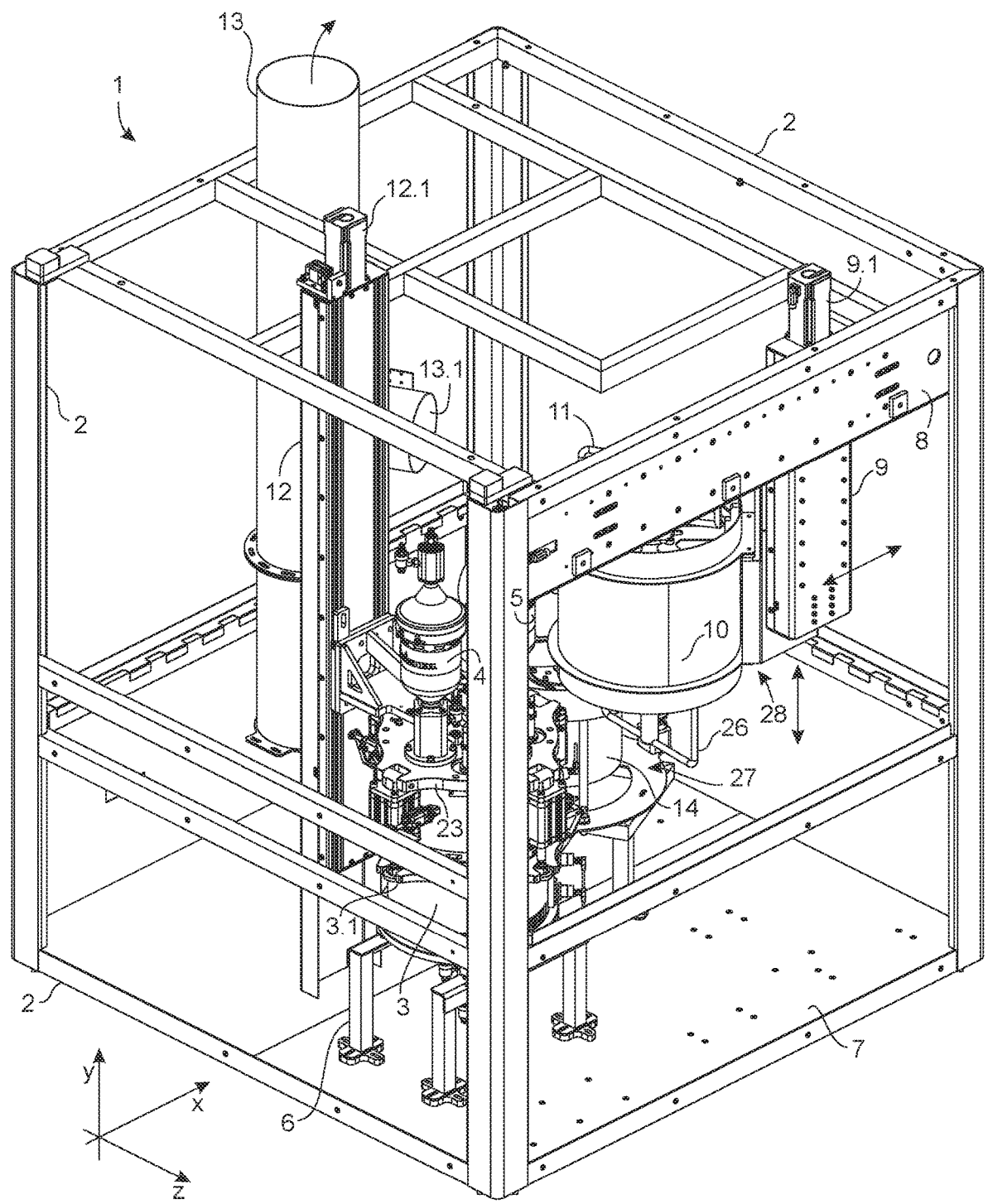
FIG. 6 shows a first three-dimensional view of a first possible embodiment of the powder center according to the invention in powder conveying mode.
Figure 7:
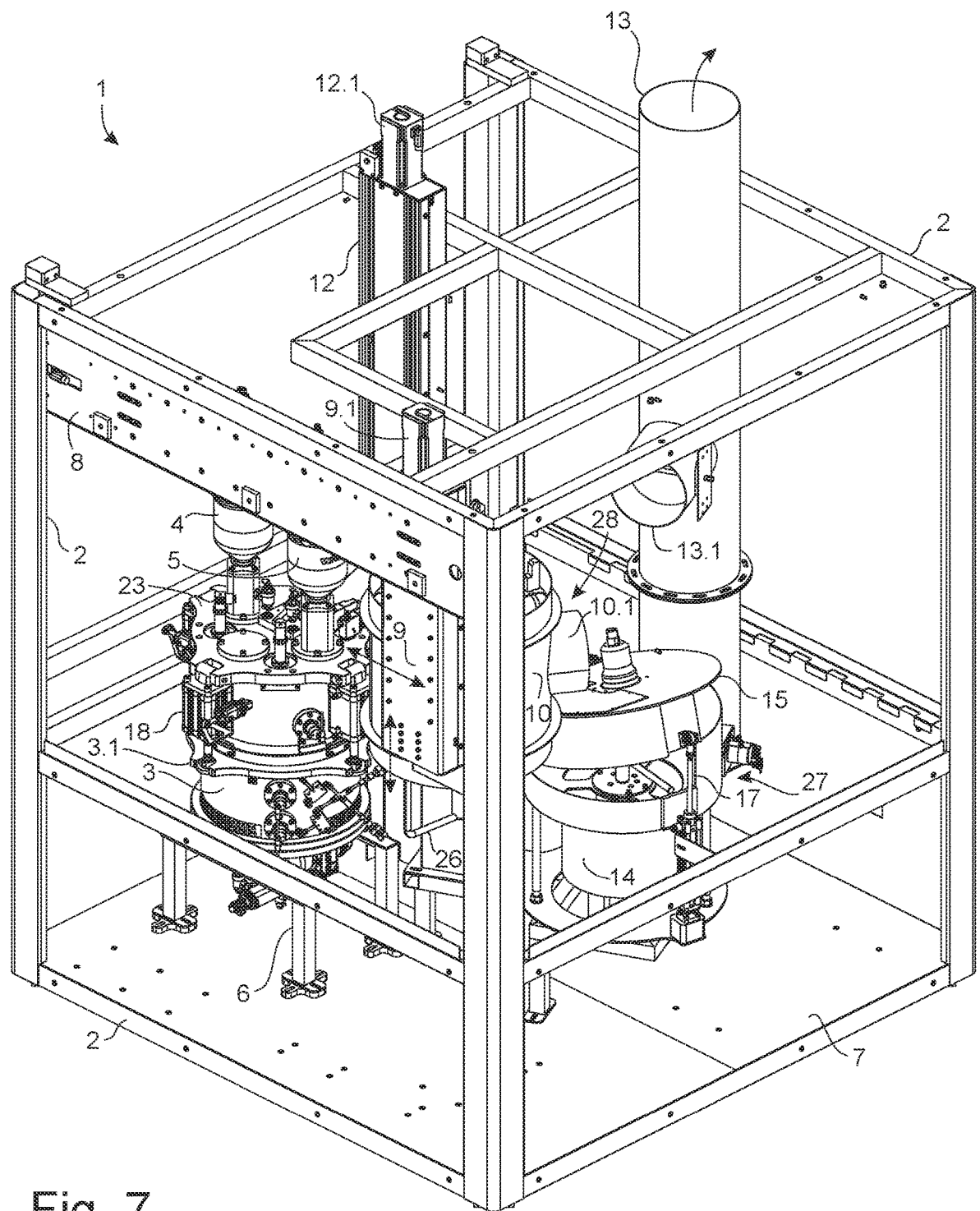
FIG. 7 shows a second three-dimensional view of the first embodiment of the powder center according to the invention.
Figure 8:
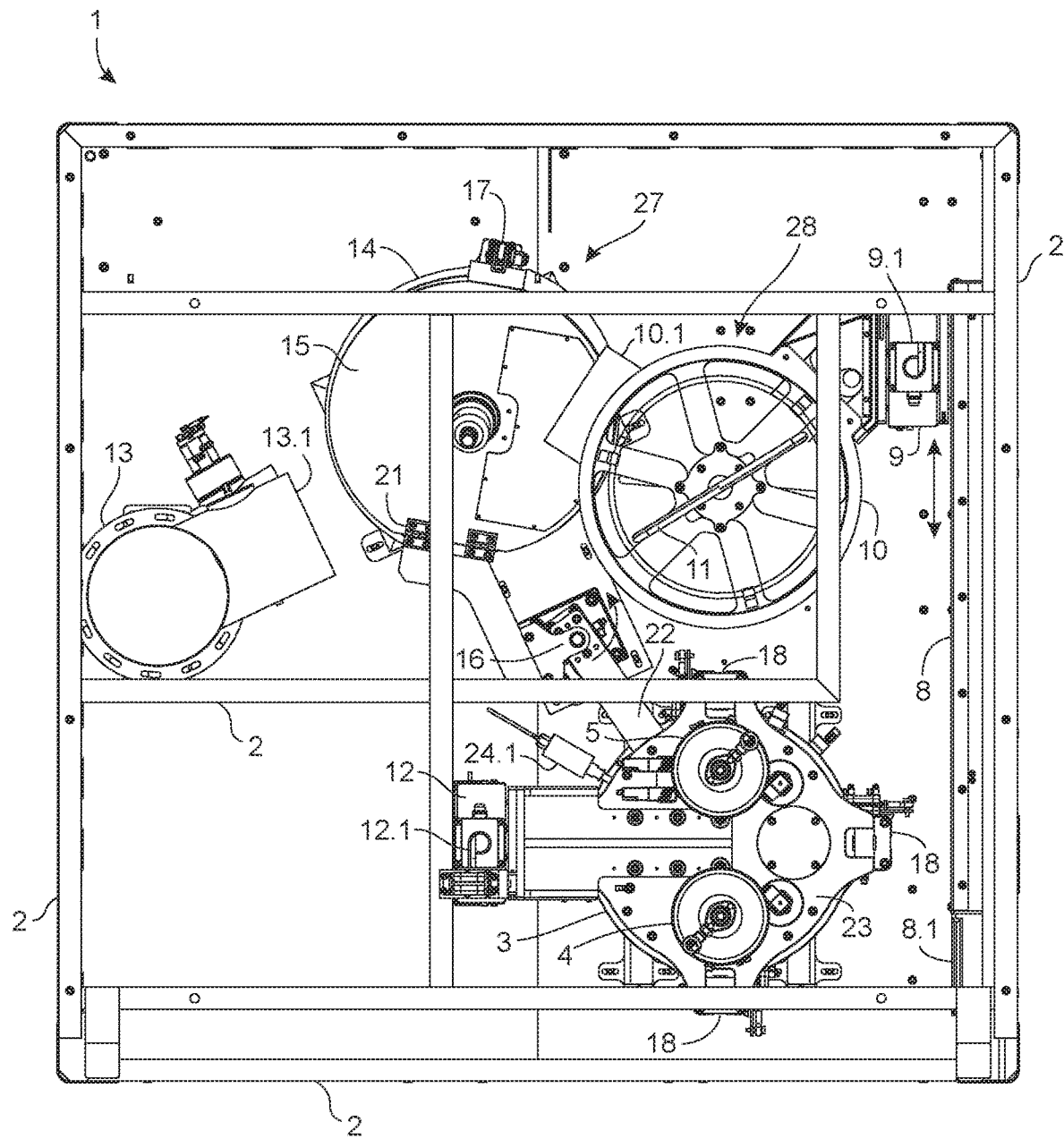
FIG. 8 shows a top view of the powder center according to the invention.
Figure 9:
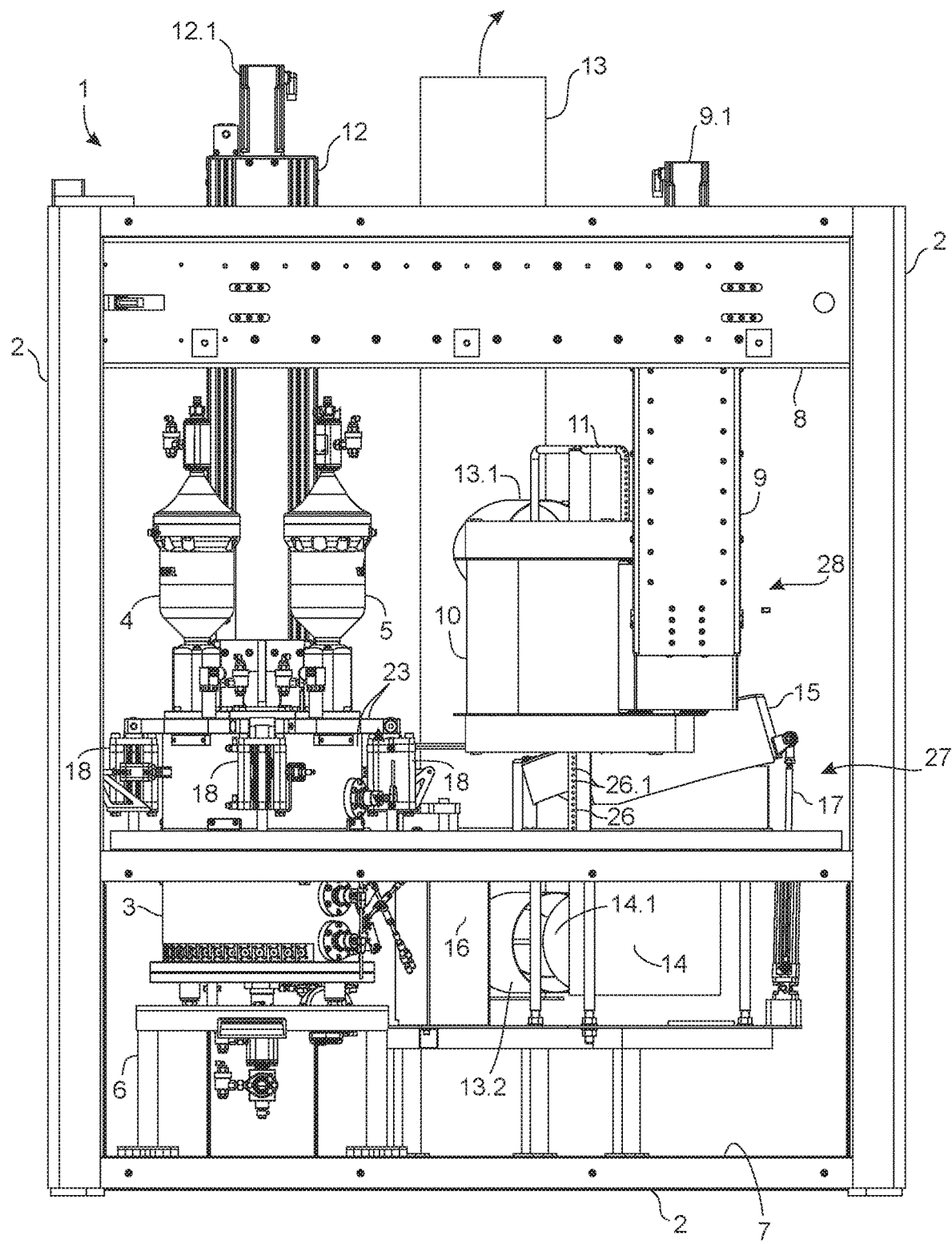
FIG. 9 shows a first side view of the powder center according to the invention.

As shown in FIG. 5, the powder conveyor 300 can be connected, as powder conveyor 4, to a working container 3, 23 to supply the container with powder. Since the working container 3, 23 is continuously pressurized during conveying mode, it is advantageous for the pressure in the intermediate container 301 to be higher than or at least equal to the pressure in the working container 3, 23. A pressure regulating valve 340 can be used to adjust the pressure in the intermediate container 301. As soon as the powder flowed out of the intermediate container 301, the outlet valve 320 and the valve 328 are being closed again. Subsequently, the intermediate container 301 can be refilled with powder in the manner described above.

The powder conveyor 300 can comprise a flange 324. The purpose of the flange 324 and screws 325 is to be able to connect the powder conveyor 300 to a further component.

The powder conveyor 300 described above can be used in various places in a powder coating facility. FIG. 5 shows a schematic block diagram of a possible embodiment of a powder coating facility having multiple powder conveyors 300 according to the invention. Three such powder conveyors 300 are identified in the powder coating facility as powder conveyor 4, 5, and 49. If reference is made to powder conveyor 4 hereinafter, this shall be understood to include the entirety made up of intermediate container 4 in a narrower sense, inlet valve M20, and outlet valve M21. The same applies analogously to the powder conveyor 5 as well.

The layout of the entire powder coating facility is illustrated in more detail in the following based on FIGS. 5 to 18.

The powder center 1, also referred to as powder supplying device, powder center or integrated powder management system, comprises a powder reservoir container 3 that is used for storing the coating powder. Moreover, the powder center 1 comprises a powder conveying device by means of which the powder is conveyed out of the powder reservoir container 3 and is transported to a powder applicator 80. The powder conveying device is integrated into the powder reservoir container 3 in the present case and shall be illustrated in more detail later on. The powder applicator 80 (see FIG. 5) can be designed as a manual or automatic powder spraying device and comprises, on its outlet facing the workpiece 65, a spray nozzle or a rotation atomizer.

The powder center 1 is designed as a module. By this means, the powder center 1 can be transported rapidly and easily as a compact unit. The individual components of the powder center 1 are attached to frame profiles 2 that can be made of aluminum or steel, for example. The frame profiles 2 form the outer boundary of the powder center 1. In case of need, the powder center 1 can comprise a base 7.

The powder reservoir container 3 of the powder center 1 can be arranged, for example, on a pedestal 6. As shown, for example, in FIG. 11, the powder reservoir container 3 can be closed off by a powder container lid 23 during conveying mode. In the embodiment shown in FIGS. 6 to 14, the powder container lid 23 takes the shape of an inverted pot. By means of pneumatic locks 18, the powder container lid 23 can be closed off tightly against the powder reservoir container 3. For this purpose, the powder reservoir container 3 comprises seals and lock receptacles 3.1 that can be engaged by appropriately designed counterparts of the pneumatic lock 18. The pneumatic lock 18 can be fitted, for example, with a cylinder, a piston, and a piston rod. When compressed air is being applied to the lower chamber of the cylinder, the piston and thus the piston rod are pushed upwards. The grab situated on the lower end of the piston rod engages the lock receptacle 3.1 and causes the powder container lid 23 to be pushed onto the powder reservoir container 3. Three locks 18 of this type are present in one embodiment (for example shown in FIGS. 8 and 9). The number of locks 18 as well as their design can be readily adapted to the respective needs.

A screen 24, which can be designed as an ultrasound screen, is situated on the inside of the powder reservoir container 3. The ultrasound transducer 24.1 of the screen 24 is preferably situated outside the powder reservoir container 3. The screen 24 is accessible and can be taken out once the powder container lid 23 is taken off. For this to take place automatically, the ultrasound screen 24 is attached to a pivoting mechanism 16 by means of a support arm 22. Using the pivoting mechanism 16, the screen 24 can be pivoted out of the working position (see FIG. 8) and can be moved into a cleaning position in a cleaning station 27 (see FIG. 14). The cleaning station 27 shall also be referred to as screen cleaning station or screen-cleaning station hereinafter.

Figure 10:
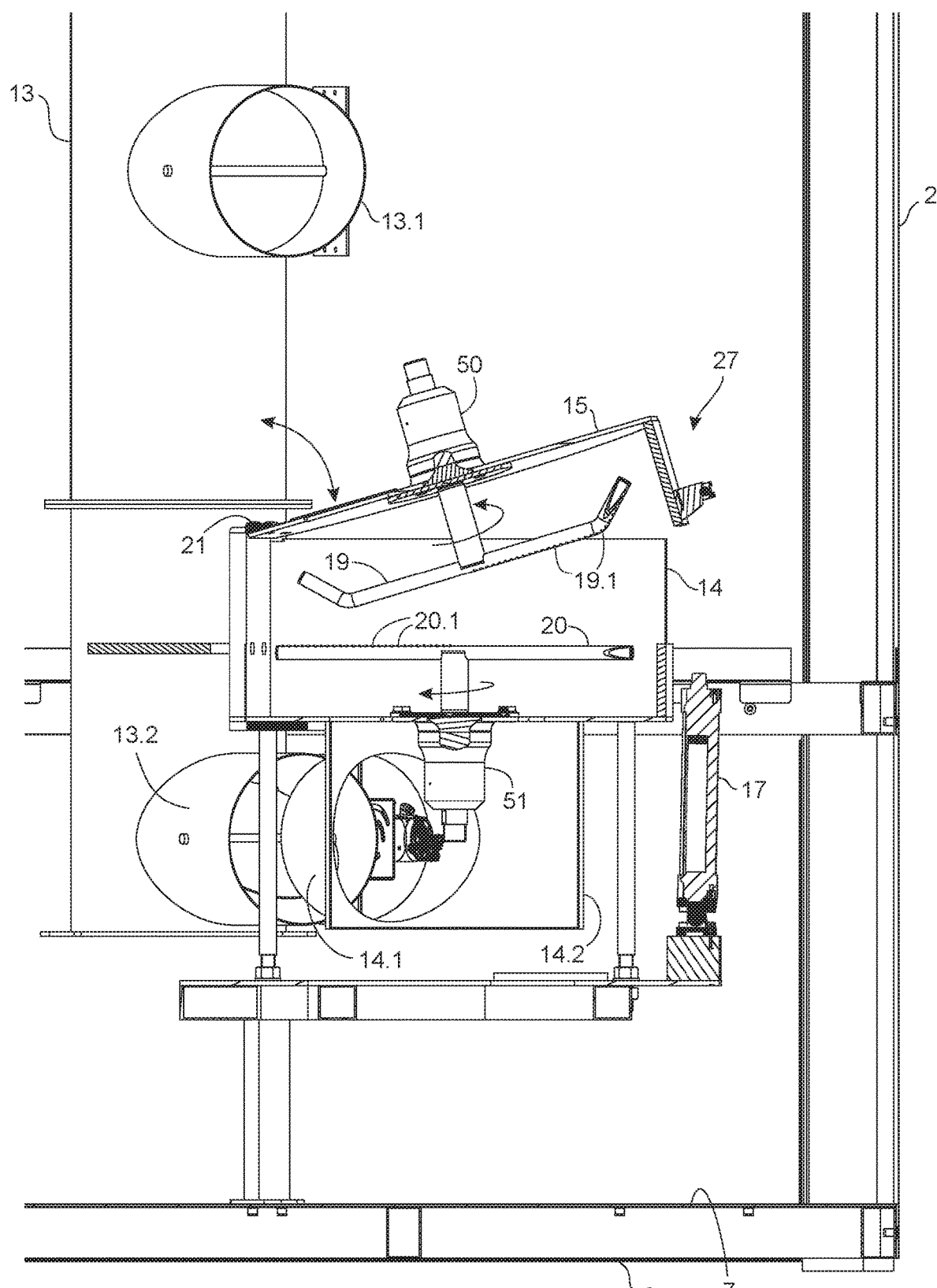
FIG. 10 shows a magnified sectioned view from the side of a part of the powder center according to the invention with the screen cleaning device.

As shown in FIG. 10, a cleaning arm 20, which is supported such that it can rotate, is situated on the inside of the cleaning station 27. The cleaning arm 20 comprises a multitude of cleaning nozzles 20.1, which are arranged on the top side of the cleaning arm 20. The cleaning station 27 also comprises a lid 15 that can be opened and closed, for example, by means of a pneumatic cylinder 17. The lid 15 is pivoted about a hinge 21 in this context. A curved double arrow indicates the pivoting motion. The lid 15 bears, on its underside, a cleaning arm 19, which is also fitted with a multitude of cleaning nozzles 19.1. The cleaning nozzles 19.1 are preferably situated on the underside of the cleaning arm 19. They are aligned appropriately such that they blow compressed air downwards onto the ultrasound screen 24, which is situated below the cleaning arm 19, during cleaning mode. The upper cleaning arm 19 is supported on the lid 15, such that it can rotate, by a bearing 50. The lower cleaning arm 20 is supported on the cleaning container 14, such that it can rotate, by a bearing 51. The two bearings 50 and 51 can just as well be designed in the form of air motors. The direction of rotation of the upper cleaning arm 19 and the direction of rotation of the lower cleaning arm 20 are each indicated by an arrow. The direction of rotation of the cleaning arm results from the offset arrangement of the cleaning nozzles and the recoil that arises when compressed air flows out through the nozzles. During cleaning mode, the ultrasound screen 24 is situated between the lower cleaning arm 20 and the upper cleaning arm 19.

The cleaning arm 19 can be angled on both ends (as shown in FIG. 10) such that it has a horizontal leg and two legs that are slanting upwards. The compressed air nozzles 19.1 can just as well be situated on the horizontal leg and on the legs slanting upwards. The cleaning arm 19 can be designed in the form of a tube for guiding the compressed air on the inside of the tube to the compressed air nozzles 19.1. The same applies analogously to the lower cleaning arm 20, even though the ends of the lower cleaning arm 20 are not angled in FIG. 10.

A lower container section 14.2 with an outlet 14.1 for accommodating the screen 24 is situated on the underside of the container 14. The outlet 14.1 can be used to aspirate the powder-air mixture that is present in the cleaning station 27. For this purpose, the outlet 14.1 is connected to an inlet opening 13.2 of a suction tube 13 by means of a hose that is not shown in the figures. The powder-air mixture can be suctioned via the suction tube 13 and a suction line 91 into an after-filter 100.

The powder reservoir container 3 and its powder container lid 23 shall also be referred to as working container 3, 23 hereinafter. The powder inlet of the working container 3, 23 is preferably situated in the upper part thereof. For example, it can be arranged in the powder container lid 23 of the working container 3, 23. The working container 3, 23 can just as well comprise multiple powder inlets. The powder inlet 23.1 is connected to the powder outlet 4.2 of an intermediate container 4 by means of a powder valve M21, which can be designed, for example, in the form of a pneumatically controlled crusher. The intermediate container 4, combined with the inlet valve M20 and the outlet valve M21, serves as powder conveyor and is usually arranged above the working container 3, 23. By this means, gravity can be used to transport powder that is situated in the intermediate container 4 downwards into the working container 3, 23.

A second powder conveyor 5 can be arranged above the working container 3, 23. The powder outlet thereof also merges into the working container 3, 23. The second powder conveyor 5 can be identical in structure to the first powder conveyor 4.

The powder conveying device that is integrated into the powder reservoir container 3 shall be illustrated in more detail in the following. The powder conveying device can be designed in the way described in European patent application EP 3 238 832 A1. The working container 3, 23 is designed and can be operated appropriately such that pressure can be applied to it. Powder can be conveyed out of the fresh powder station 30 and can be transported into the working container 3, 23 by means of the powder conveyor 4. A corresponding powder inlet is present in the powder container lid 23 that covers the powder reservoir container 3 on the top. The working container 3, 23 comprises, in the area of the container base 25, a fluidizing insert 25.1 for fluidizing the powder, and a series of powder outlets 3.2. The invention can provide one powder outlet valve G1-G36 to be connected to each of the powder outlets 3.2. In turn, one powder line 81 each is connected to each of the powder outlet valves G1-G36. Moreover, each of the powder lines 81 comprises an inlet for transport air on the inlet side, i.e. in the proximity of the corresponding powder outlet valve G1-G36. On the outlet side, each of the powder lines 81 is preferably connected to one of the powder applicators 80 each by means of a coupling 130. The amount of powder to be conveyed is controlled by repeatedly opening and closing the corresponding powder outlet valve G1-G36 by means of a controller 70. To avoid repetitions, reference shall be made to the aforementioned patent application EP 3 238 832 A1, the content of which shall herewith be made a part of the present application.

Figure 11:
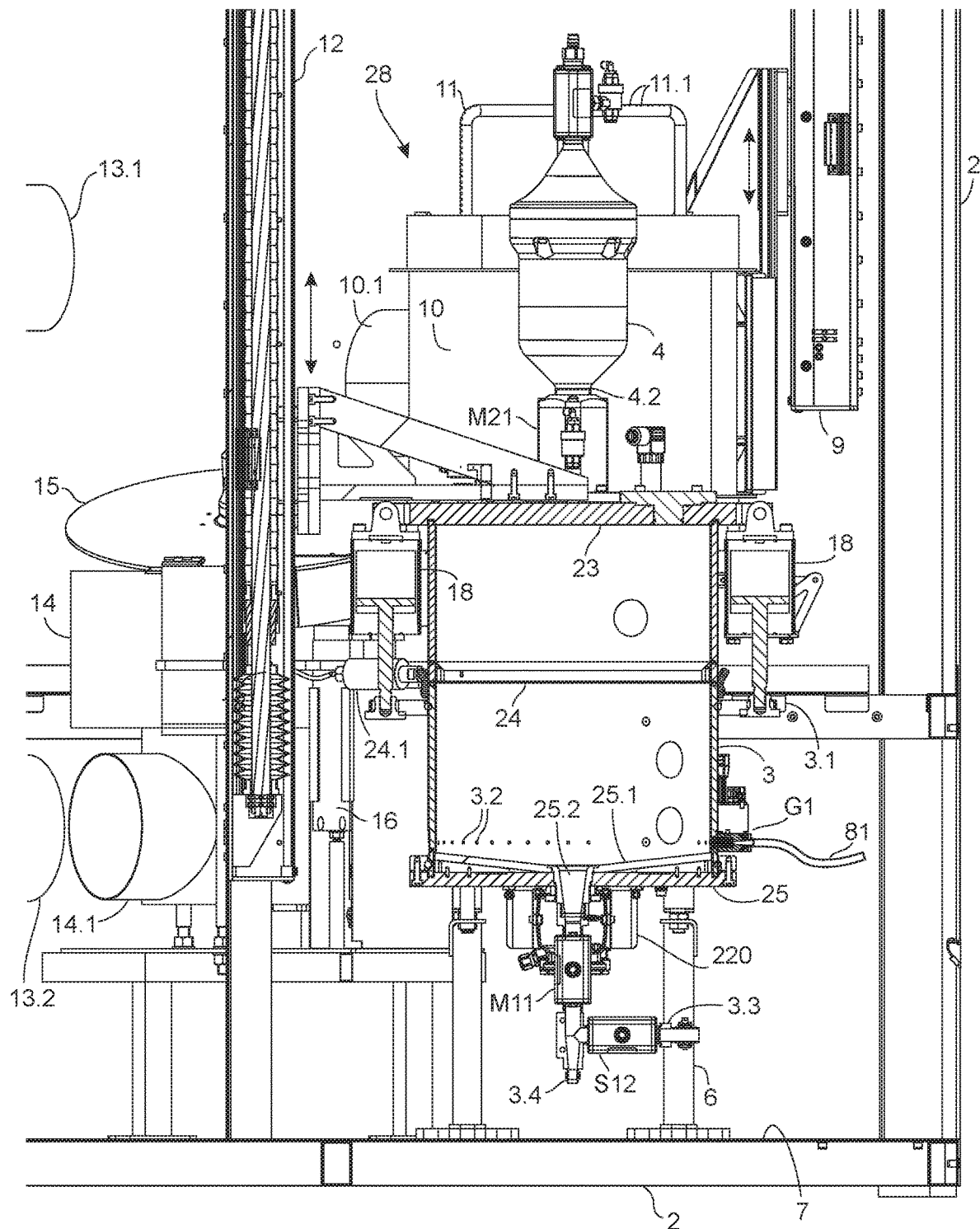
FIG. 11 shows a magnified sectioned view from the side of another part of the powder center according to the invention with the container cleaning facility.

An embodiment of the working container 3, 23 provides a vibrator 220 that can be situated, for example, below the powder reservoir container 3 (see FIG. 11). The shaking motions generated by the vibrator 220 can be used to fluidize the powder-air mixture in the powder reservoir container 3 even more homogeneously. Moreover, by this means, the powder-air mixture can flow even more optimally out of the powder outlet channel 203.

For this purpose, the coupling 130 comprises a first group of connectors 131 and a second group of connectors 132. The controller 70 can be used to adjust which connector of the first group 131 is connected to which connector of the second group 132. Accordingly, each individual powder line 81 can be connected, on the outlet side, to one connector of the first group 131 each. Each individual powder line can be connected to a connector of the second group 132 each, and can be connected, on the other side, to one of the powder applicators 80 each.

In one embodiment, 36 powder outlet valves G1-G36 are used. However, more or fewer powder outlet valves can be used just as well. The number of powder outlet valves that is used depends on the number of powder applicators 80 that are used.

As an alternative to the integrated powder conveying device with the power outlet valve G1 just described, the invention can just as well provide a powder injector that works according to the Venturi principle or a powder pump for dense phase conveying.

Instead of the powder conveyor 4, a powder pump for dense phase conveying, a hose pump or a powder injector can just as well be provided. The same shall apply to the powder conveyor 5 analogously.

A powder outlet 25.2 that is connected to the outlet 3.3 of the reservoir container 3 by means of a valve M11 is situated in the base 25 of the powder reservoir container 3. By means of the outlet 3.3, residual powder that is still present in the powder reservoir container 3 can be transported back to the fresh powder station 3 with the aid of a powder conveyor 49. For this purpose, the powder conveyor 49 can be connected to the outlet 3.3 of the reservoir container 3 by means of a hose that is not shown in the figures.

The powder reservoir container 3 and the powder container lid 23 thereof as well as the two powder conveyors 4 and 5 are attached to a vertical linear axle 12, which is also referred to as linear lifting device, and can be moved up and down by this device. The drive 12.1 of the linear axle 12 can be situated on the top of the linear axle 12. The direction of motion thereof is indicated by the vertical double arrow in FIG. 11.

In addition, the powder center 1 comprises a container cleaning unit 28, or cleaning unit for short, that comprises a cleaning container 10, an upper cleaning arm 11, and a lower cleaning arm 26. The upper cleaning arm 11 and the lower cleaning arm 26 are supported in the cleaning container 10 such that they can rotate and each comprise a multitude of compressed air-operated cleaning nozzles 11.1 or 26.1. The cleaning container 10 is attached to a linear lifting device 9 and can be moved vertically upwards and downwards (in y direction) by the device. The direction of motion thereof is indicated by the vertical double arrow in FIG. 11. The drive 9.1 of the linear lifting device 9 can be situated on the top of the linear lifting device 9. The linear lifting device 9, in turn, is attached to a horizontally-aligned linear drive 8 (also referred to as linear axle) and can be moved horizontally (in x direction) back and forth by same. The drive 8.1 of the linear axle 8 can be situated on the side of the linear axle 8. It is possible, by means of the linear axle 8, to position the container cleaning unit 28 laterally next to the working container 3, 23 (see FIGS. 6 to 9) during conveying mode. During cleaning mode, the container lid 23 is driven upwards first; then the container cleaning unit 28 can be positioned appropriately by means of the two linear drives 8 and 9 such that the cleaning container 10 is first moved over the powder reservoir container 3 and is then lowered to the extent such that the cleaning arm 26 is situated at a defined distance from the base 25 of the powder reservoir container 3. The cleaning arm 26 projecting on the bottom from the cleaning container 10 is then situated inside the powder reservoir container 3 and serves for cleaning the inner wall and the base 25 of the powder reservoir container 3.

The linear drive 12 can then be used to lower the powder container lid 23 to the extent such that the cleaning arm 11 that projects on the top from the cleaning container 10 can be used to blow off, and thus clean, the inner surfaces of the powder container lid 23. The cleaning arm 11 projects into the inside of the powder container lid 23 in this context.

One possible embodiment of the fresh powder station 30 is shown in various views in FIGS. 15 to 18.

Figure 17:
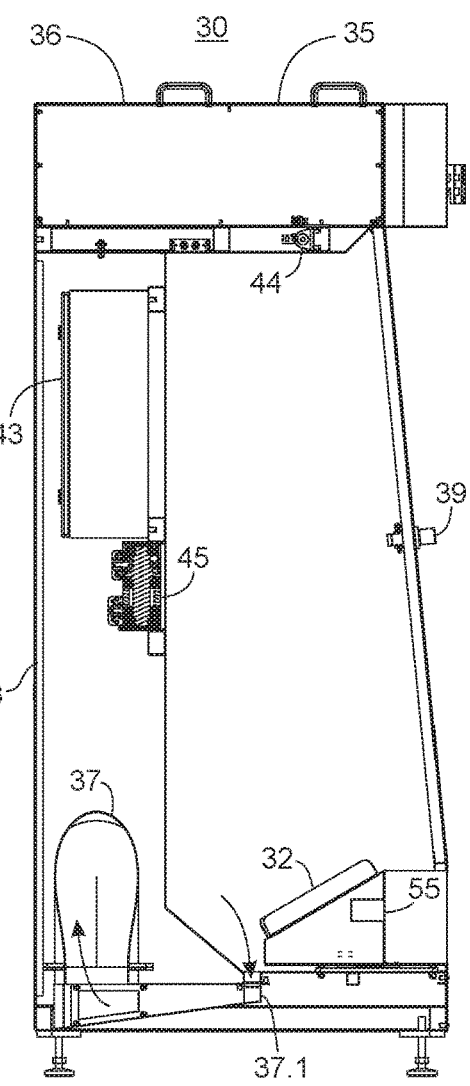
FIG. 17 shows a sectioned side view of the fresh powder station.
Figure 18:
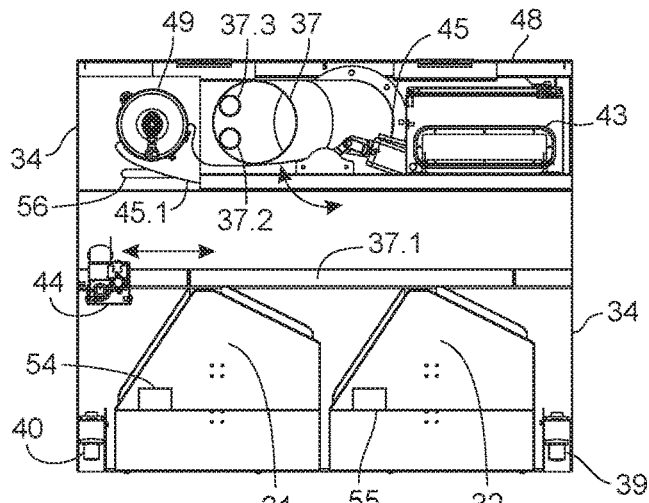
FIG. 18 shows a sectioned top view of the fresh powder station.

The fresh powder station 30 can be designed, for example, as an independent module. The station comprises a first storage space 31 and a second storage space 32, which each can accommodate a powder carton 110, 111 (see FIG. 5). The two storage spaces 31 and 32 are preferably arranged such as to be slanted such that the powder migrates obliquely downwards into a corner in the powder carton supported by gravity. By this means, the powder carton can be readily emptied by means of a suction lance 33 without any residue or hardly any residue being left behind. As shown in FIGS. 17 and 18, the suction lance 33 can be moved horizontally by means of a linear drive 44 such that it can be used for both a powder carton that is arranged on the first storage space 31 as well as for a powder carton that is arranged on the second storage space 32. Moreover, the fresh powder station 30 comprises an additional linear drive 38 to be able to move the suction lance 33 vertically as well.

A vibrator 54 and a scale 46 are situated below the storage space 31 for the powder carton 110. The purpose of the vibrator 54 is to agitate the powder in the carton 110 such that it is distributed better and flows in the direction of the suction lance 33.

The scale 46 can be used to determine the filling level in the carton 110, and to initiate a change of powder cartons once the filling level drops below a certain level. Moreover, the measuring signal generated by the scale 46 can be used to recognize if there is still sufficient space in the carton 110 when powder is to be conveyed via the line 96 from the powder center 1 back to the powder station 30.

Likewise, a vibrator 55 and a scale 47 are situated below the storage space 32. Their purpose is analogous to that of the vibrator 54 and of the scale 46 in the case of storage space 31.

To be able to clean the suction lance 33, the fresh powder station 30 comprises, in addition, a cleaning station 52 that is equipped with a wiper ring and/or compressed air nozzles and/or a suction system. By this means, powder adhering to the outside of the suction lance 33 can be removed during the up and down motion.

In addition, air nozzles 57 can be provided on the cleaning station 53 for cleaning of the lower area of the suction lance 33. If the suction lance 33 comprises a fluidizing crown for fluidizing the powder in the suction area, same can be cleaned with this as well.

Instead of two storage spaces 31 and 32 with two powder cartons 110 and 111, just one storage space 32 and a powder container 150 with a fluidizing facility could be installed just as well. For example, two pumps 124 and 125 could be used to convey powder from a Big Bag 121 into the powder container 150 via a powder line 127 each.

Instead of or in addition to the Big Bag 121, a Big Bag 120 with a pump 123 could be provided just as well. The powder can be pumped via a powder line 126 directly to the powder conveyor 4 by a pump 123.

The Big Bag 120 or 121 is also referred to as Flexible Intermediate Bulk Container or FIBC, for short. It usually contains larger amounts of powder than the powder carton 110 and the powder carton 111. Moreover, the Big Bag 120/120 usually stands farther away from the powder conveyor 4 than the powder carton 110 or 111. Accordingly, the Big Bag 120/121 can stand at a distance of, for example, 30 m from the powder conveyor 4, whereas the powder carton 110 or 111 stands, for example, at a distance of 5 m from the powder conveyor 4.

The fresh powder station 30 can comprise multiple compressed air regulating valves 39 and 40 and adjusting knobs 41 and 42. The compressed air regulating valve 39 can be designed for adjusting the fluid air of the fluid base of the powder container 150. The purpose of the compressed air regulating valve 40 is to adjust the fluid air at the fluidizing crown of the suction lance 33. The adjusting knob 41 can be used to control the position of the exhaust air damper. The adjusting knob 42 can be used to transmit a confirmation signal to the controller.

The fresh powder station 30 can comprise, in its base area, a suction system 37 with a suction opening 37.1 to be able to aspirate excess powder out of the inside of the fresh powder station 30. The fresh powder station 30 can also comprise a flexible suction hose that can be used for manual cleaning in case of need.

The invention can provide the fresh powder station 30 to comprise a pivoting mechanism 45 for the powder conveyor 49. The pivoting mechanism 45 comprises a drive, which can, for example, be designed as a pneumatic drive, and a pivoting arm 45.1. The pivoting mechanism 45 can be used to transition the powder conveyor 49 out of the conveying position (see FIG. 15) into a cleaning position. In the cleaning position, the powder conveyor 49 projects into the interior space of the fresh powder station 30. In addition, air nozzles 56 can be provided for cleaning of the lower area of the powder conveyor 49 when it is being pivoted out of the conveying position into the cleaning position or out of the cleaning position into the conveying position.

The pneumatic drive can comprise two pneumatically driven cylinders. By this means, the powder conveyor 49 can be transitioned into a cleaning position, a first conveying position, and a second conveying position. To transition the powder conveyor 49 into the cleaning position (see FIG. 15), the cylinder 1 and the cylinder 2 are being retracted. In the first conveying position, the powder conveyor 49 is situated above the storage space 31. For this purpose, the cylinder 1 is being retracted and cylinder 2 is being driven out. In the second conveying position, the powder conveyor 49 is situated above the storage space 32; the cylinders 1 and 2 are driven out. In the first conveying position, powder can be conveyed back into the powder carton 110, and, in the second conveying position, powder can be conveyed back into powder carton 111.

The suction lance 33 can be transitioned into three different positions by the linear axle 38 and the linear drive 44: In the cleaning position (see FIG. 15), the suction lance 33 is situated in the cleaning station 53. In the first conveying position, the suction lance 33 is situated above the storage space 31 and, in the second conveying position, it is situated above the storage space 32.

In case of need, the fresh powder station 30 can just as well be equipped with its own controller 43. For example the suction lance 33, the cleaning station 52 for the suction lance 33, the linear axle 38, the linear drive 44, the pivoting mechanism 45, and the blow nozzles 56 and 57 can be controlled by said controller 43.

Figure 16:
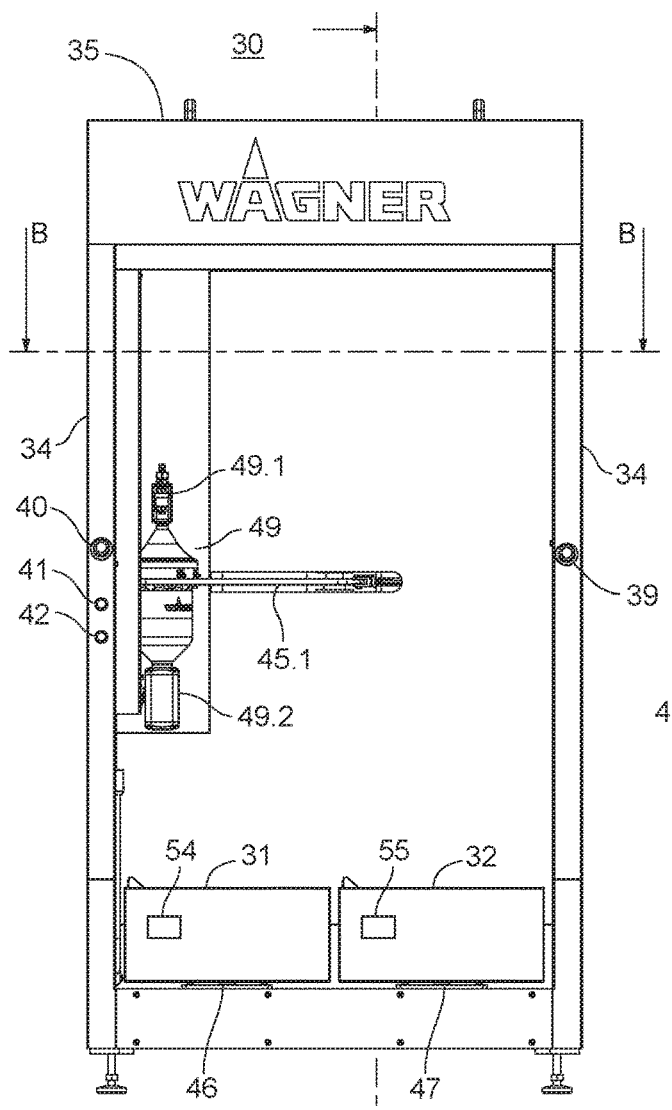
FIG. 16 shows a frontal view of the fresh powder station.

The powder conveyor 49 shown, for example, in FIGS. 16 and 18 is advantageously being positioned directly above the powder carton 110 or 111 into which it is to convey powder. Since it utilizes gravity, the powder drops into the powder carton situated below the powder conveyor 49 once the outlet valve 49.2 of the powder conveyor 49 is opened.

The powder conveyor 49 used for returning the powder can just as well be designed differently. For example, it can be designed as a powder pump. Since a powder pump of this type does not utilize gravity, it can be arranged in different places. For example, it can be situated at the same height level as the powder carton 110.

Two covers 35 and 36 that can be opened manually can be provided on the topside of the powder station 30. By this means, the staff also has access from above to the inside of the fresh powder station 30.

In case of need, the fresh powder station 30 can just as well be equipped with side walls 34 and a rear wall 48.

One possible embodiment of a total facility for powder coating of workpieces 65 is shown in simplified manner as a block diagram in FIG. 5. The total facility can be controlled by means of a central controller 70. The controller 70 can be connected via corresponding control lines (not shown in the Figures) to various components of the total facility and can be provided for controlling the powder coating cabin 60 including powder applicators 80, the fresh powder station 30, the powder center 1, the powder recycling 90, and/or the after-filter 100.

Alternatively or in addition to the central controller 70, the fresh powder station 30 can comprise a separate controller 43, as has been mentioned above. The same applies analogously to all other components of the total facility for the coating of workpieces with powder.

Since all powder particles sprayed by the powder applicators 80 do not adhere to the workpieces 65 to be coated during the coating process, the excess powder, which is also referred to as overspray, needs to be removed from the cabin 60. This is necessary, firstly, because the surrounding area outside of the cabin needs to be kept free of powder dust. Secondly, the explosion hazard increases when a certain powder concentration is exceeded by the powder dust cloud floating in the cabin. This needs to be prevented.

The overspray arising during the coating and the air present in the cabin 60 are suctioned out of the cabin 60 as a powder-air mixture and are fed to a device for powder recovery 90 via a residual powder pipeline 92. The device for powder recovery 90 can be designed, for example, as a cyclone. The powder recovered therein can be fed to the powder center 1 again via a powder line 94 in case of need. In order to also remove, by filtering, the fraction of powder that was not removed, by filtering, in the cyclone 90, the powder-air mixture can be fed from the cyclone via a suction line 93 to the after-filter 100.

The powder-air mixture in the residual powder pipeline 92 is also referred to as residual powder air flow. For aspiration of the overspray out of the cabin 60, the cabin 60 comprises, for example, a suction slit. It connects the inside of the cabin 60 to the residual powder pipeline 92. The suction slit and the suction tube 61 are therefore used to aspirate excess powder from the inside of the cabin as a powder-air mixture and to feed it to a cyclone separator 90, or cyclone for short, that can be designed as a mono-cyclone. The powder-air mixture flows tangentially into the cyclone 90 and flows spirally downward inside the cyclone. In the process, the powder particles are pushed outwards against the outer wall of the cyclone 90 by the centrifugal force that arises during the rotation of the powder-air flow. The powder particles are conveyed downwards in the direction of the powder outlet of the cyclone, and are collected there. The air from which the powder particles have been removed is aspirated via the vertical central tube that is situated in the cyclone 90. Thus cleaned, the air flow is often fed to an after-filter 100 in order to remove, by filtering, even the last residual powder present in the air. The powder recycled in the cyclone 90 can be re-used for coating and can be fed to the powder center 1 via the powder line 94.

Conveying Mode/Conveying Operation

In conveying mode, the ultrasound screen 24 is situated in the working container 3, 23, between the powder reservoir container 3 and the powder container lid 23. The locks 18 make sure that the working container is closed in airtight manner. The screen cleaning device 27 and the container cleaning unit 28 are situated in the parking position, as shown in FIGS. 6 to 9.

The parking position for the container cleaning unit 28 is situated next to the powder reservoir container 3. The term «next to the powder reservoir container» shall also comprise above, below, in front of or behind the powder reservoir container.

The screen 24 is not obligatory for conveying mode. The conveying of powder can also take place without an ultrasound screen or without a screen 24 altogether.

Cleaning Mode/Cleaning Operation

For switching from conveying mode to cleaning mode, the conveying of powder out of the powder reservoir container 3 is stopped and the residual powder that is still present in the powder reservoir container 3 is aspirated using the outlet 25.1. The overpressure that is still prevailing in the working container 3, 23 is reduced to normal pressure and the locks 18 are opened.

Then, the powder container lid 23 is lifted by means of the linear drive 12 and the ultrasound screen 24 is pivoted out of the working position into the cleaning position by means of the pivoting mechanism 16.

Figure 12:
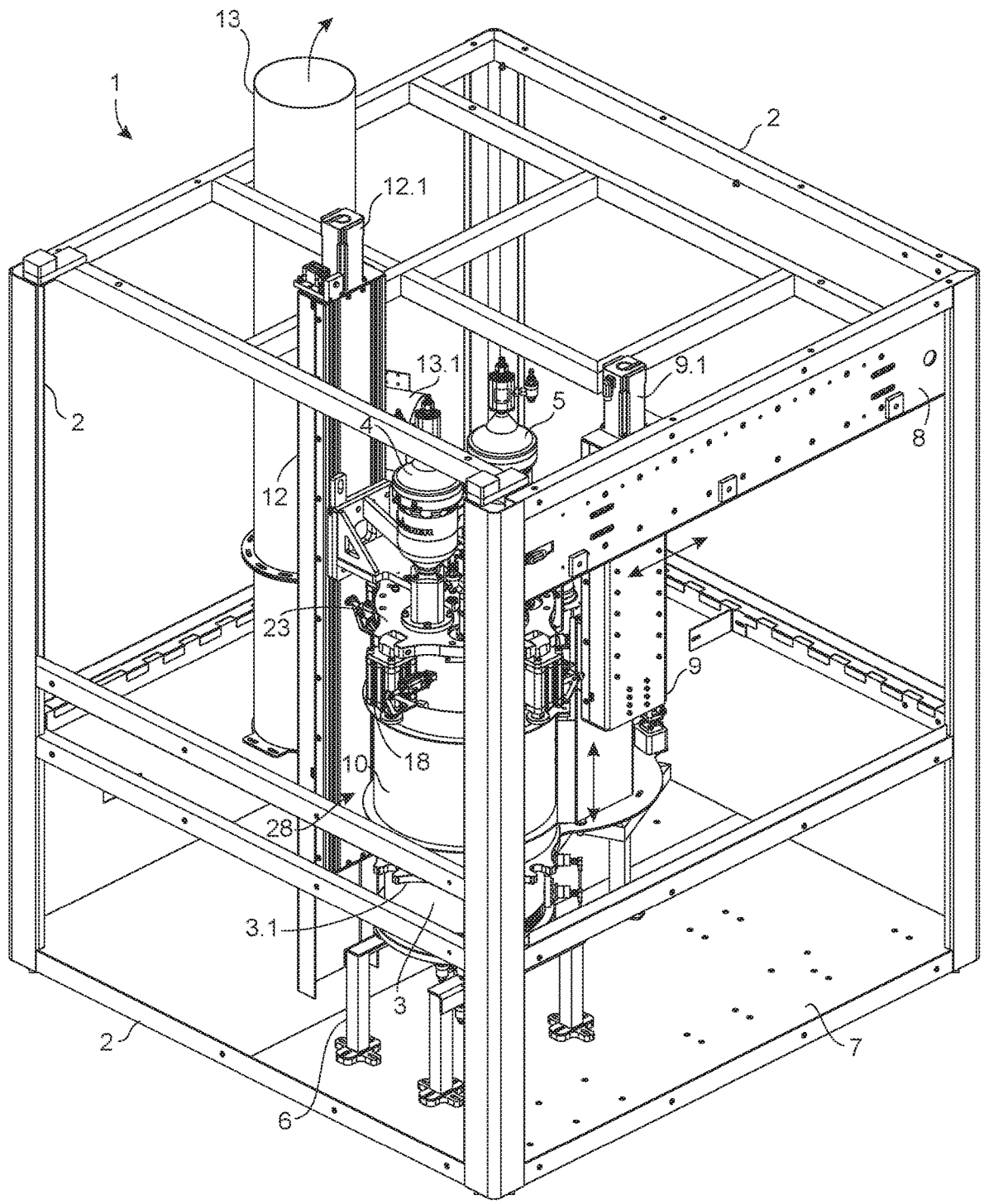
FIG. 12 shows a first three-dimensional view of the powder center according to the invention in cleaning mode.
Figure 13:
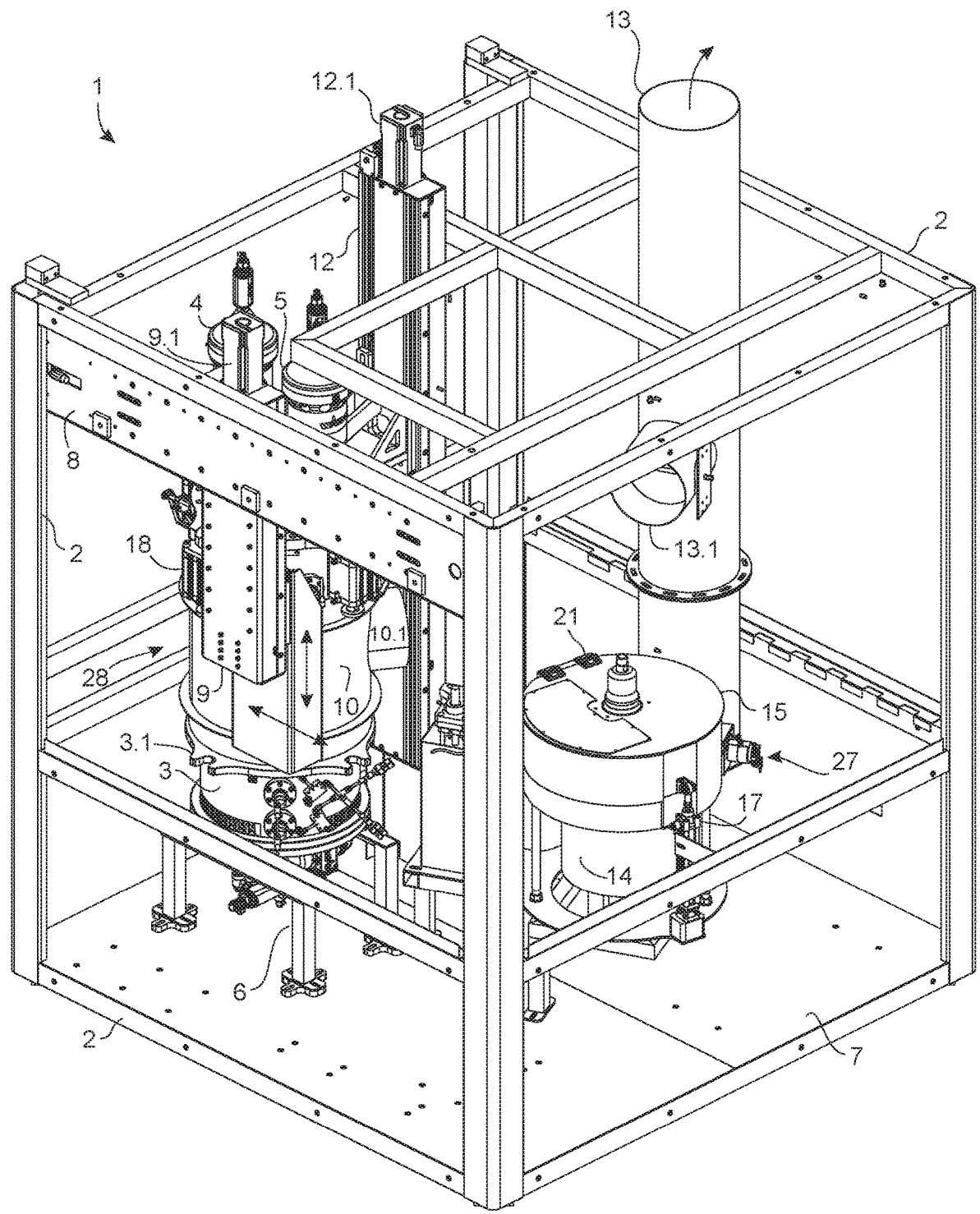
FIG. 13 shows a second three-dimensional view of the powder center according to the invention in cleaning mode.
Figure 14:
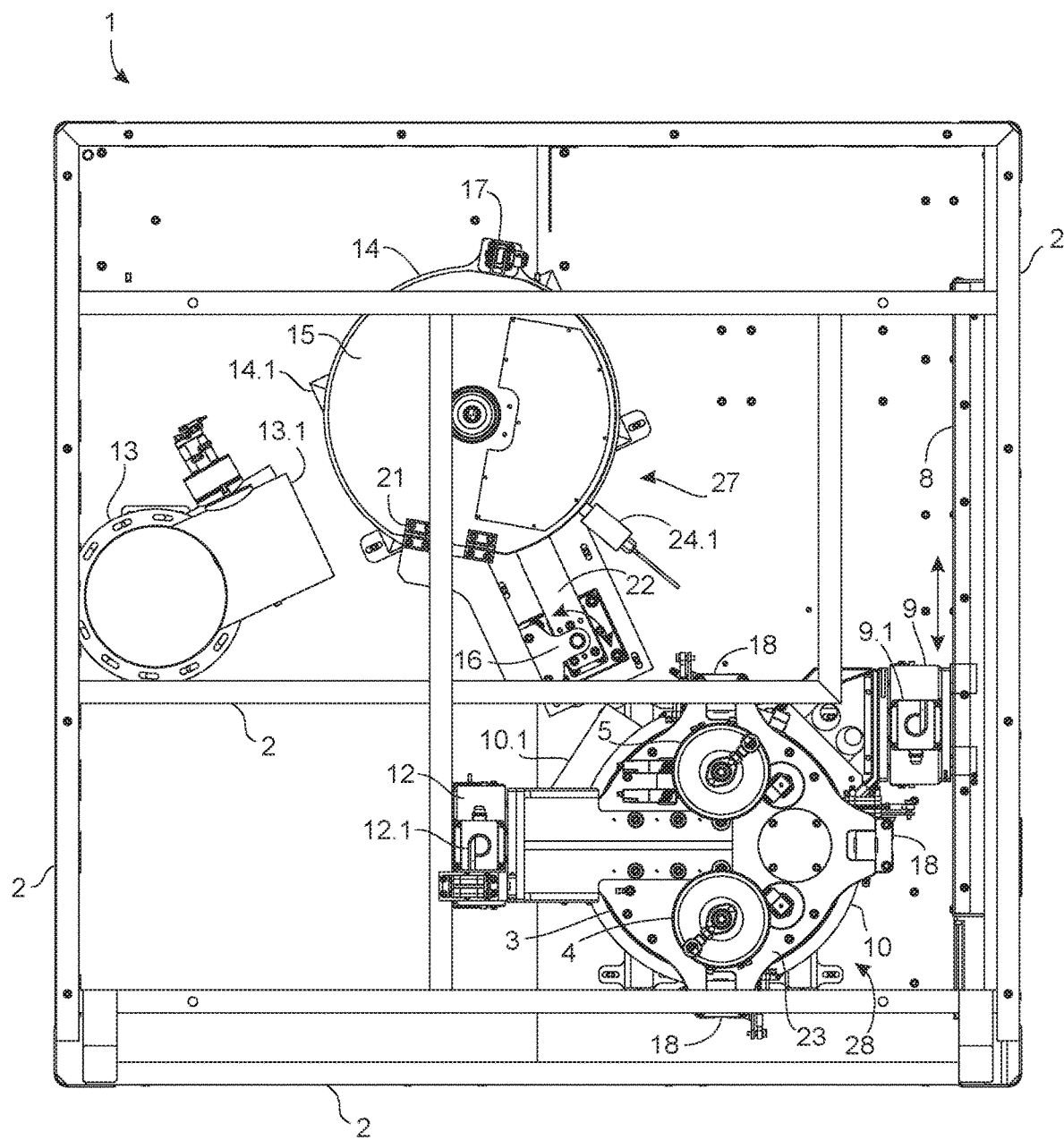
FIG. 14 shows a top view of the powder center according to the invention in cleaning mode.
Figure 15:
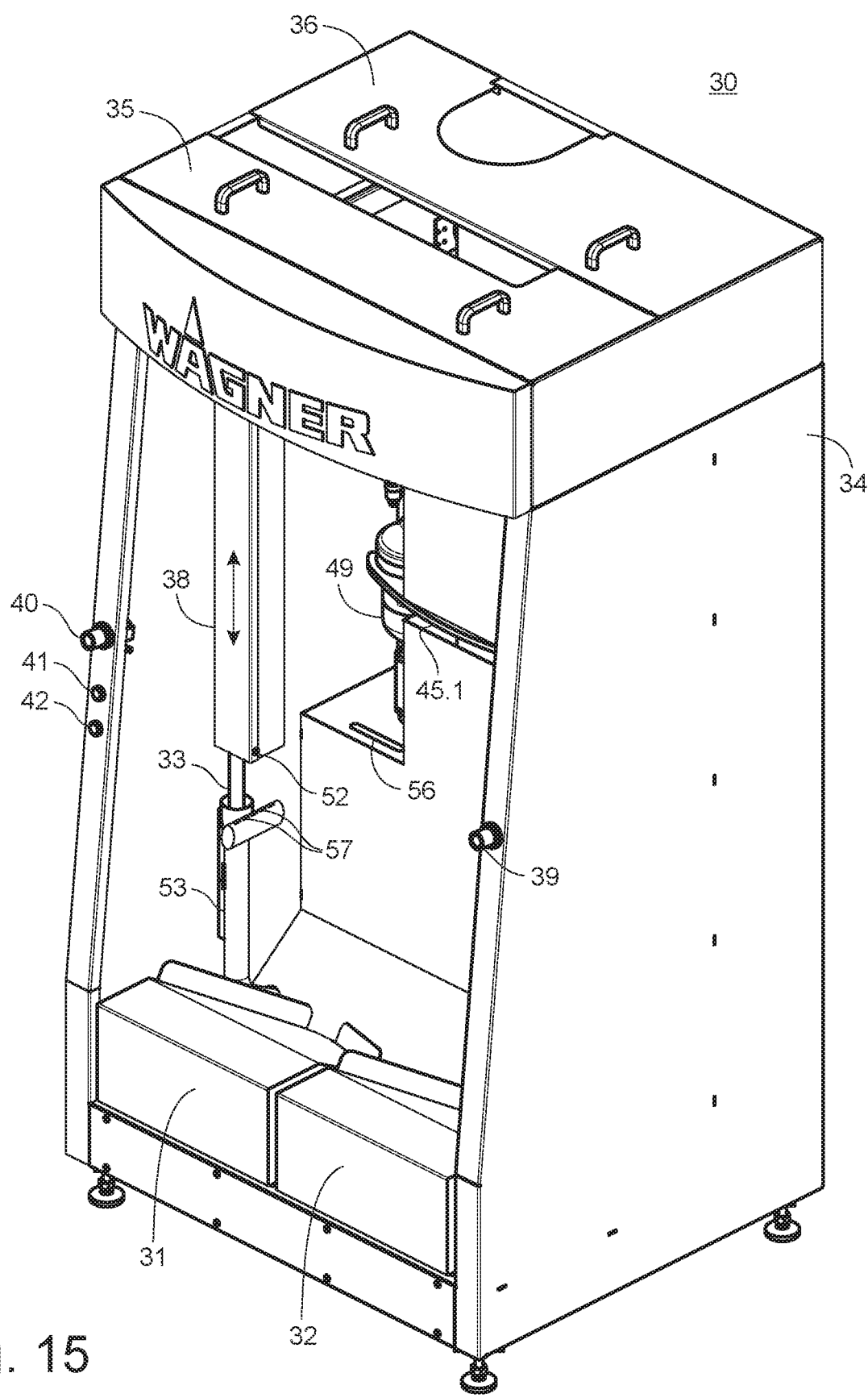
FIG. 15 shows a three-dimensional view of a possible embodiment of a fresh powder station.

As shown in FIGS. 12 to 14, the linear drive 12 lifts the container lid 23 to the extent such that the cleaning container 10 can be driven in between the powder container lid 23 and the powder reservoir container 3 by the two linear axles 8 and 9. Subsequently, the container cleaning unit 28 including the cleaning container 10 is lowered sufficiently until the lower cleaning arm 26 is situated on the inside of the powder reservoir container 3 and is situated at a defined distance from the base 25 of the powder reservoir container 3.

The powder container lid 23 is then lowered to the extent such that the upper cleaning arm 11 is situated on the inside of the powder container lid 23 and is situated at a defined distance from the powder container lid 23.

In the embodiment above, an air gap remains between the powder container lid 23 and the cleaning container 10. Likewise, an air gap remains between the powder container 3 and the cleaning container 10. The after-filter 100 aspirates air through the air gap. This prevents the powder-air mixture generated by the compressed air nozzles 11.1 and 26.1 during the cleaning process from escaping into the surroundings.

Instead, it is feasible just as well to lower the powder container lid 23 to the extent such that no gap remains between the powder container lid 23 and the cleaning container 10. Likewise, the gap between the cleaning container 10 and the powder container 3 can be eliminated by lowering the cleaning container 10 to the extent such that it is placed on top of the powder container 3.

In another embodiment, the locks 18 can close the unit made up of powder container lid 23, cleaning container 10, and powder reservoir container 3, in airtight manner.

In a next step, compressed air is blown through the nozzles 11.1 and 26.1 in the direction of the inner walls of the powder container lid 23 and of the powder reservoir container 3. The powder-air mixture thus generated is aspirated via the suction line 13 and can be fed to the cyclone 90 and/or to the after-filter 100.

The cleaning of the powder conveyor 4 can take place as follows. A purging valve S13 (see FIG. 5) is used to blow compressed air, preferably intermittently, into the powder inlet valve M20 and through the powder conveyor 4 in the direction of the powder outlet valve M21. The compressed air is aspirated by the suction system 13 in the direction of the after-filter 100. Simultaneously, compressed air is blown through the valve 328 (see FIG. 3) through the porous wall of the tube 305 and the tube is thus blown off to be free of powder dust proceeding from outside toward the inside. The compressed air value is increased markedly at the pressure regulator 340 for the cleaning process, for example to 5 bar. As a result, clearly more compressed air flows and the cleaning becomes more efficient.

As a matter of principle, the cleaning of the powder conveyor 5 can proceed analogously by the way and manner described above.

The two powder conveyors 4 and 5 can be connected to each other by a material valve M22 (see FIG. 5). If the material valve M22 is controlled appropriately, the two powder conveyors 4 and 5 can be cleaned by means of a single purging valve S13. Instead, the powder conveyor 4 can just as well be cleaned by means of a first purging valve and the powder conveyor 5 can be cleaned by means of a second purging valve.

The powder conveyor 49 can also be cleaned by the way and manner described above. Instead of the purging valve S13, the purging valve S12 is used during the cleaning of the powder conveyor 49. The powder removed during the cleaning can be aspirated via the suction opening 162 and line 37.

For the reasons stated above, it is advantageous to blow a large amount of compressed air (e.g. 5 bar) not only through the purging valve S13, but also through the purging valve S12.

As soon as the screen 24 and/or the ultrasound screen is situated in the cleaning container 14, the lid 15 is closed by means of the pneumatic cylinder 17. An air gap can remain between the lid 15 and the cleaning container 14. In another embodiment, the lid 15 can just as well be placed on the cleaning container 14 in airtight manner.

Now, compressed air is being blown through the nozzles 19.1 and 20.1 from above and below onto the screen 24. The powder-air mixture thus generated is aspirated via the suction line 13 and can be fed to the cyclone 90 and/or to the after-filter 100.

As soon as the screen 24 is clean, the blowing off of the screen is terminated. Once the powder container 3 and the container lid 23 are clean, the blowing off is terminated here as well.

If the locks 18 had previously been closed, they are now being opened again. The container lid 23 is being lifted and the container cleaning unit 28 is being moved back into the parking position (see FIGS. 6-9). The lid 15 is being lifted as well. Once the cleaning mode is completed, the screen 23 is driven back into its working position. Subsequently, the conveying of powder can be started again.

Cleaning Mode with Intensive Cleaning

The following cleaning steps can be carried out in order to clean the powder center 1 and the other components of the facility contacting the coating powder even more thoroughly. The steps are preferably carried out automatically and are coordinated by the controller 70. The cleaning unit 28 is used to clean the powder reservoir container 3 and the container lid 23, as described above. In a further step, a switch to a different coating powder is carried out. The other coating powder in this context can be the powder that is the next to be used for coating the workpieces 65. But this does not necessarily have to be the case. Instead, a switch to a special cleaning agent can be carried out just as well. The cleaning agent can be, for example, a granulate with a grain size between 2 mm and 7 mm. The grain size, the grain material, and the grain properties are preferably selected appropriately such that, firstly, the cleaning agent can be conveyed through all openings in the powder system and, secondly, has a good cleaning effect. The selection of the cleaning agent advantageously takes into consideration that no additional wear and tear in the powder system and no chemical incompatibility with the coating powder arises.

In an additional step, a switch to conveying mode is effected for a limited period of time such that the other coating powder and/or the cleaning agent flows through the individual components of the facility. During the brief conveying mode, for example 3 kg of powder that are ultimately lost can be conveyed. But it is also feasible to recover the material (the powder and/or the cleaning agent) in the cyclone 90. As a result, the powder lines 91, 92, 93, and 94 can also be purged with the new material. This is of advantage, in particular, if the new powder is conveyed to be recovered.

Subsequently, the powder reservoir container 3 and the container lid 23 are cleaned again by means of the cleaning unit 28.

The preceding description of exemplary embodiments according to the present invention serves for illustrative purposes only. Various changes and modifications are feasible within the scope of the invention. Accordingly, for example, the various components shown in FIGS. 1 to 18 can be combined with each other in a way different from what is shown in the Figures.

LIST OF REFERENCE NUMBERS

1 Powder center
2 Frame profiles
3 Powder reservoir container
3.1 Lock receptacle
3.2 Outlet opening for powder
3.3 Compressed air connector for purging air
3.4 Powder outlet
4 Powder conveyor
4.2 Powder outlet
5 Powder conveyor
6 Pedestal
7 Base sheet
8 Linear drive
8.1 Drive motor
9 Linear drive
9.1 Drive motor
10 Cleaning container
10.1 Outlet
11 Cleaning arm for the lid
11.1 Cleaning nozzles
12 Linear drive
12.1 Drive motor
13 Suction line/suction tube
13.1 Inlet opening
13.2 Inlet opening
14 Screen cleaning container
14.1 Outlet
14.2 Lower container section
15 Lid of the screen cleaning device
16 Pivoting mechanism
17 Lifting cylinder
18 Lock
19 Cleaning arm
19.1 Screen cleaning nozzles
20 Cleaning arm
20.1 Screen cleaning nozzles
21 Hinge
22 Support arm for the powder screen
23 Container lid
23.1 Powder inlet
24 Ultrasound screen
24.1 Ultrasound transducer
25 Container base
25.1 Fluidizing insert
25.2 Outlet
26 Cleaning arm for the powder reservoir container
26.1 Cleaning nozzles
27 Screen cleaning device
28 Cleaning unit/container cleaning unit
30 Fresh powder station
31 First storage space
32 Second storage space
34 Side wall
35 Cover
36 Cover
37 Suction system
37.1 Suction opening
37.2 Suction opening
37.3 Suction opening
38 Linear axle for the suction lance
39 Compressed air regulating valve
40 Compressed air regulating valve
41 Adjusting knob
42 Adjusting knob
43 Controller
44 Linear drive
45 Pivoting mechanism for powder conveyor
45.1 Arm
46 Scale
47 Scale
48 Rear wall
49 Powder conveyor
49.1 Powder inlet valve
49.2 Powder outlet valve
50 Bearing
51 Bearing
52 Cleaning station
53 Cleaning station
54 Vibrator
55 Vibrator
56 Compressed air nozzle
57 Compressed air nozzle
60 Powder coating cabin
65 Workpiece
70 Controller
71 Control line
80 Powder spray gun
81 Powder line
90 Powder recovery
91 Suction line
92 Suction line
93 Suction line
94 Powder line
95 Suction line
96 Powder return line
97 Powder line
98 Powder line
100 After-filter
110 Powder carton
111 Powder carton
120 Big Bag
121 Big Bag
123 Powder pump
124 Powder pump
125 Powder pump
126 Powder line
127 Powder line
130 Coupling
131 First group of connectors
132 Second group of connectors
142 Residual powder line
150 Intermediate container for powder
160 Suction opening
162 Suction opening
220 Vibrator
300 Powder conveyor
301 Container/housing
302 Top part of the housing 302.1 Funnel-shaped inner wall
302.2 Ledge
302.3 Inner wall
302.4 Ledge
302.5 Inner wall
302.6 Ledge
302.7 Socket
303 Middle part of the housing
304 Bottom part of the housing
304.1 Funnel-shaped inner wall
304.2 Ledge
304.3 Inner wall
304.4 Ledge
304.5 Inner wall
304.6 Socket
304.7 Housing wall
305 Tube
305.1 First tube end/powder passage
305.2 Second tube end/powder passage
305.3 First end surface of the tube
305.4 Second end surface of the tube
305.5 Chamfer on the side surface
305.6 Inner side surface
305.7 Chamfer on the side surface
305.8 Chamfer on the side surface
305.9 Outer side surface
305.10 Chamfer on the side surface
305.11 Upper inner edge
305.12 Lower inner edge
306 Space
307 Powder chamber
308 Compressed air control connector
308.1 Opening
309 Screw
310 Powder inlet valve
310.1 Inlet of the inlet valve
310.2 Outlet of the inlet valve
311 Valve housing
312 Hose nipple
313 Compressed air valve
313.1 Compressed air control connector
314 Grounding cable
314.1 Grounding connector
316 Valve
320 Powder outlet valve
320.1 Inlet of the outlet valve
320.2 Outlet of the outlet valve
321 Valve housing
322 Flange
323 Compressed air valve
323.1 Control connector
324 Flange
325 Screw
326 Screw
327 Vacuum valve
328 Valve
340 Pressure regulating valve
A Detail
B Detail
G1-G36 Outlet valves
L1 Inside distance between the upper ledge and the lower ledge
L1' Outside distance between the upper ledge and the lower ledge
L5 Length of the filter
LA Longitudinal axis
M11 Valve for powder material
M20 Valve for powder material
M21 Valve for powder material
M22 Valve for powder material
S11 Purging valve
S12 Purging valve
S13 Purging valve
x x-axis/horizontal line
y y-axis
z z-axis
α2 Angle at the upper ledge
α4 Angle at the lower ledge
α52 Angle at the upper end face of the filter
α54 Angle at the lower end face of the filter
β2 Angle
β4 Angle

The invention claimed is:

1. A powder conveyor for the conveying of coating powder, the powder conveyor comprising:
a housing for a container comprising a top part having a powder inlet and an upper ledge, and a bottom part having a powder outlet and a lower ledge, wherein the upper ledge has an upper clamping surface and the lower ledge has a lower clamping surface, and wherein at least one of the upper clamping surface and the lower clamping surface is situated at an acute angle with respect to horizontal,
a tube having tube ends that are open such that the powder can pass through the tube, wherein the tube is made of a porous air-permeable material, and wherein the tube is clamped, on respective end face sides, between the upper clamping surface of the upper ledge of the top part of the housing and the lower clamping surface of the lower ledge of the bottom part of the housing,
a powder inlet valve that is connected to the powder inlet of the top part of the housing, and
a powder outlet valve that is connected to the powder outlet of the bottom part of the housing.

2. The powder conveyor according to claim 1, wherein the top part of the housing is funnel-shaped.

3. The powder conveyor according to claim 1, wherein the bottom part of the housing is funnel shaped.

4. The powder conveyor according to claim 1, wherein an angle of the upper clamping surface and/or an angle of the lower clamping surface is in a range of 1° to 7°.

5. The powder conveyor according to claim 1, wherein an inner wall that is adjacent to the upper ledge forms an angle with respect to vertical that is in a range of 5° to 15°.

6. The powder conveyor according to claim 1, wherein an inner wall that is adjacent to the lower ledge forms an angle with respect to vertical that is in a range of 5° to 15°.

7. The powder conveyor according to claim 1, wherein the distance between the upper ledge and the lower ledge decreases in the direction of the longitudinal axis of the housing.

8. The powder conveyor according to claim 1, wherein the first and/or the second tube end comprises a chamfer.

9. The powder conveyor according to claim 1, wherein the tube has a length between the tube ends that is a first distance, wherein a distance between the upper ledge and the lower ledge is a second distance, and wherein the first distance is between 1 mm and 3 mm greater than the second distance.

10. The powder conveyor according to claim 1,
wherein the housing for the container comprises a tube-shaped middle part of the housing.

11. The powder conveyor according to claim 10,
wherein the middle part of the housing is screwed and/or glued to the bottom part of the housing.

12. A powder center for supplying a powder coating facility with coating powder, comprising:
the powder conveyor according to claim 1, wherein the powder conveyor is configured to supply a powder reservoir container,
wherein the powder reservoir container comprises a powder conveying device for transporting powder out of the powder reservoir container in the direction of the powder coating facility,
wherein a container lid is provided that covers the powder reservoir container when powder is being conveyed and can be removed for the purpose of cleaning the powder reservoir container,
wherein a cleaning unit for cleaning the powder reservoir container and the container lid is provided that can be moved from a parking position next to the powder reservoir container into a cleaning position inside the powder reservoir container by way of a manipulator, and
wherein a controller is provided that is configured to control the powder conveyor, the powder conveying device, the cleaning unit, and the manipulator.

13. The powder center according to claim 12,
wherein the controller is configured to control purging the inside of the powder conveyor with purging air during a cleaning mode.

14. The powder center according to claim 12,
wherein the cleaning unit comprises compressed air nozzles for blowing off the powder reservoir container and the container lid.

15. A method for manufacturing the powder conveyor according to claim 1, comprising:
heating the tube,
using a tool to shape the tube ends of the heated tube such that the end faces of the tube are complimentary to the acute angle, and
clamping the tube between the upper and lower clamping surfaces.

* * * * *